(12) United States Patent
Yamazaki

(10) Patent No.: US 12,309,071 B2
(45) Date of Patent: May 20, 2025

(54) SYSTEM AND METHOD OF CONTROLLING SYSTEM

(71) Applicant: CANON KABUSHIKI KAISHA, Tokyo (JP)

(72) Inventor: Daisuke Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 18/517,242

(22) Filed: Nov. 22, 2023

(65) Prior Publication Data
US 2024/0179098 A1  May 30, 2024

(30) Foreign Application Priority Data

Nov. 28, 2022 (JP) ................. 2022-189695

(51) Int. Cl.
| | | |
|---|---|---|
| G06F 15/173 | (2006.01) | |
| G06F 3/12 | (2006.01) | |
| H04L 47/263 | (2022.01) | |
| H04L 49/90 | (2022.01) | |
| H04L 43/065 | (2022.01) | |

(52) U.S. Cl.
CPC .......... H04L 47/263 (2013.01); G06F 3/1294 (2013.01); H04L 49/90 (2013.01); *H04L 43/065* (2013.01)

(58) Field of Classification Search
None
See application file for complete search history.

(56) References Cited

U.S. PATENT DOCUMENTS

| | | | | |
|---|---|---|---|---|
| 7,058,705 | B1 * | 6/2006 | Fukasawa | G06F 21/6272 709/224 |
| 2008/0049631 | A1 * | 2/2008 | Morrill | H04L 43/04 370/250 |
| 2010/0127881 | A1 * | 5/2010 | Schechter | H05K 7/20836 340/584 |
| 2011/0010625 | A1 * | 1/2011 | Pettersson | H04L 1/0022 709/234 |
| 2018/0288114 | A1 * | 10/2018 | Liu | H04L 65/613 |
| 2019/0384858 | A1 * | 12/2019 | Yalakanti | G06F 16/9032 |

FOREIGN PATENT DOCUMENTS

JP          2020145647 A    9/2020

* cited by examiner

*Primary Examiner* — Phuoc H Nguyen
(74) *Attorney, Agent, or Firm* — Canon U.S.A., Inc. IP Division

(57) ABSTRACT

When the number of real-time events received from the same device exceeds a threshold value within a predetermined period of time, the monitoring server transmits a data sending request for stopping transmission of real-time events but transmitting regular events to the device. When it is determined, based on the regular events received from the device that has been stopped from transmitting real-time events, that the abnormality in the device has been resolved, a data sending request for restarting to transmit real-time events is transmitted to the device.

10 Claims, 21 Drawing Sheets

FIG. 4A

```
{
  'collections': [
    {
      'fire': 'realtime',                  ———— 4006
      'collection': [
        'Alert',                           ———— 4007
        'Capacity',                        ———— 4008
        'Cover',                           ———— 4009
        'Part',                            ———— 4010
        ...,
      ]
    },
    {
      'fire': 'cron(0 */12 * * *)',        ———— 4011
      'collection': [
        'Alert',                           ———— 4012
        'Capacity',                        ———— 4013
        'Cover',                           ———— 4014
        'Part',                            ———— 4015
        ...,
      ]
    }, ...
  ]
}
```

FIG. 4C

```
{ ─── 4101
    "id": "b318dd0c-78c5-4ece-8fef-1b3c8d2e636d", ─── 4103
    "event": "PartstStatusChanged", ─── 4104
    "device_id": "72591a75-8731-4237-b8e3-c7f4583e520a", ─── 4105
    "occurrence_date_time": "20220721T032400.226+0900", ─── 4106
    "documents": [
        {
            "type": "FixingUnit",
            "attribute": {
                "status": {
                    "deterioration": [
                        {
                            "type": "NeedReplacement", ─── 4107
                            "target": "FixingUnit", ─── 4108
                            "state": "Now", ─── 4109
                            "alerts": [
                                {
                                    "alertCode": "03456789" ─── 4110
                                }
                            ]
                        }
                    ]
                }
            }
        }
    ] ─── 4102
}
```

FIG. 4D

```
{
    "id": "78059d41-4e8d-44cb-bc2d-1c8ccec671ae",
    "event": "PartstStatusChanged",
    "device_id": "72591a75-8731-4237-b8e3-c7f4583e520a",
    "occurrence_date_time": "20220721T033000.627+0900",
    "documents": [
        {
            "type": "FixingUnit",                              ———— 4112
            "attribute": {
                "status": "",                                  ———— 4113
                "deterioration": [
                    {
                        "type": "NeedReplacement",
                        "target": "FixingUnit",
                        "state": "",                           ———— 4114
                        "alerts": []                           ———— 4115
                    }
                ]
            }
        }
    ]
}
```
⎫
⎬ 4111
⎭

FIG. 4F

```
{
    "device_id": "72591a75-8731-4237-b8e3-c7f4583e520a", ――― 4202
    "device_name": "DeviceA", ――― 4203
    "location": "BUILDING A/SECOND FLOOR", ――― 4204
    "ip_v4_address": "172.16.0.0", ――― 4205
    "is_event_receiving_stopped": false ――― 4206
}
```
⎫ 4201

```
{
    "alert_id": "72591a75-8731-4237-b8e3-c7f4583e520a|NeedReplacement|FixingUnit", ――― 4210
    "device_id": "72591a75-8731-4237-b8e3-c7f4583e520a", ――― 4211
    "alert_status": [
        {
            "type": "NeedReplacement", ――― 4212
            "target": "FixingUnit", ――― 4213
            "state": "Now", ――― 4214
            "alert_list": [
                {
                    "alert_code": "03456789", ――― 4215
                    "alert_level": "Error", ――― 4216
                }
            ]
        }
    ], ⎫ 4209
    "occurrence_date_time": "20220721T032400.226+0900" ――― 4217
}
```
⎫ 4208
⎫ 4207

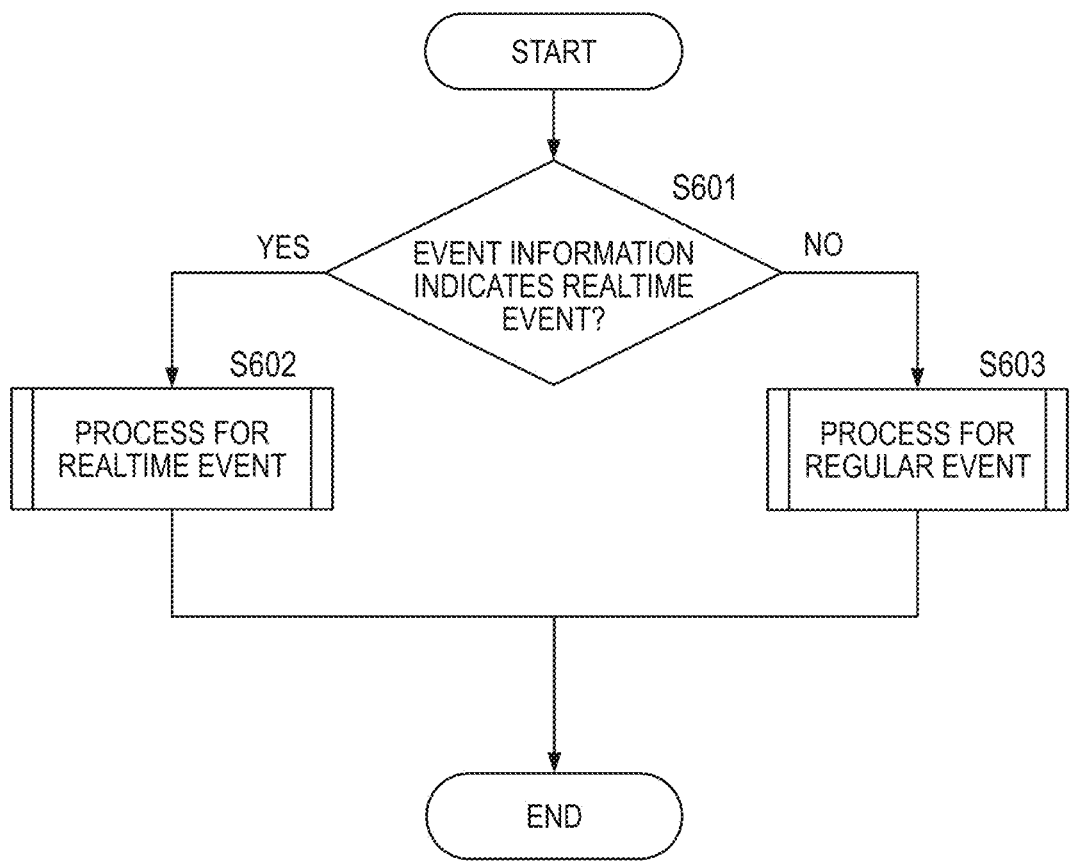

FIG. 7

```
{
    'collections': [
        {
            'fire': 'realtime',
            'collection': [
                ...,
            ]
        },                                            701
        {
            'fire': 'cron(0 */1 * * *)',  ——————— 703
            'collection': [
                'Alert',
                'Capacity',
                'Cover',
                'Part',
                ...,
            ]
        },                                            702
        ...
    ]
}
```

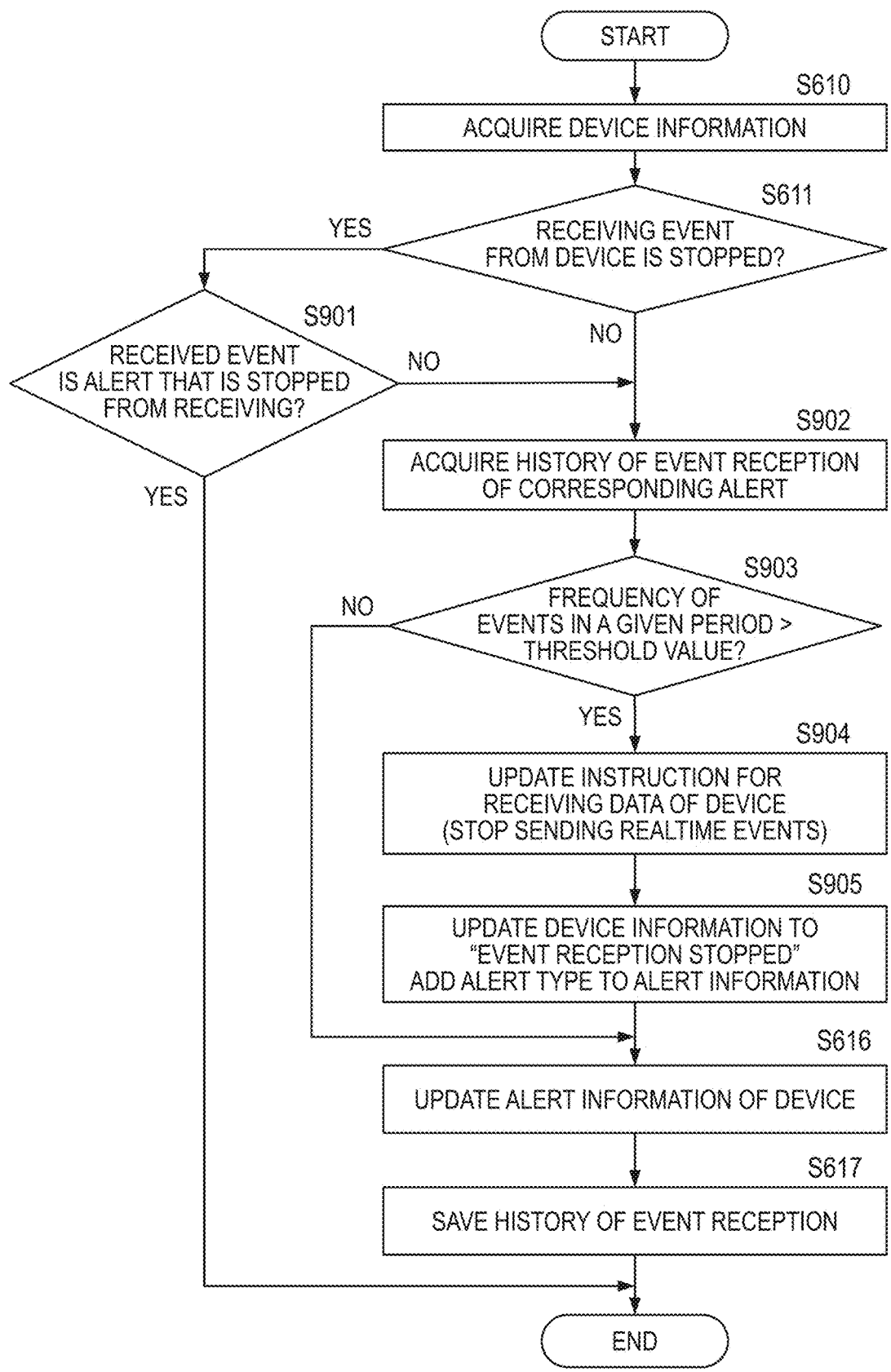

FIG. 10A

```
{
  "device_id": "72591a75-8731-4237-b8e3-c7f4583e520a",
  "device_name": "DeviceA",
  "location": "BUILDING A/SECOND FLOOR",
  "ip_v4_address": "172.16.0.0",
  "is_event_receiving_stopped": true,                          ---- 4206
  "limit_exceeded_alerts": [
    {
      "type": "NeedReplacement",                               ---- 1001
      "target": "FixingUnit",                                  ---- 1002
      "status": "Stopped",                                     ---- 1003
    },
    {
      "type": "CoverOpen",                                     ---- 1004
      "target": "Body",                                        ---- 1005
      "status": "Verifying",                                   ---- 1006
      "verificaition_start_time": "20220721T120100.627+0900"   ---- 1007
    }
  ]
}
```

```
{
  'collections': [
    {
      'fire': 'realtime',
      'collection': [
        'Alert',
        'Capacity',
        ...,
      ]
    },
    {
      'fire': 'cron(0 */1 * * *)',
      'collection': [
        'Part',
        'Cover',
        ...,
      ]
    },
    {
      'fire': 'cron(0 */12 * * *)',
      'collection': [
        'Alert',
        'Capacity',
        ...,
      ]
    },
    ...
  ]
}
```

- 4002 → first block — 1011
- 810 → second block — 1012
- 4003 → third block — 1013
- 4016 → entire collections

FIG. 12

DEVICE DETAILS

DEVICE NAME: DeviceA
INSTALLED PLACE: BUILDING A/SECOND FLOOR
PRODUCT NAME: MFP-C5500
IP ADDRESS: 172.16.0.0

| STATUS | EXPENDABLES | SECURITY |

ERROR NEEDED TO BE TAKEN CARE OF BY USER HAS OCCURRED. EVENTS RECEIVED FROM DEVICE ARE TEMPORARILY LIMITED TO REDUCE LOAD AT PRESENT. DISPLAYED STATUS MAY BE DIFFERENT FROM STATUS OF DEVICE.

ERROR INFORMATION

| DETAILS OF ERROR | DATE AND TIME OF OCCURRENCE | ELAPSE OF TIME FROM OCCURRENCE |
|---|---|---|
| FIXING UNIT NEEDS TO BE EXCHANGED | JULY 21, 2022 03:24:00 | ONE MINUTE |

▼ ERROR HISTORY

| ERROR INFORMATION | DATE AND TIME OF OCCURRENCE | DATE AND TIME OF SOLUTION |
|---|---|---|
| SHEET IS CLOGGED | 2022/07/20 09:45:12 | 2022/07/20 09:46:33 |

SYSTEM AND METHOD OF CONTROLLING SYSTEM

BACKGROUND

Field

The present disclosure relates to a system and a method of controlling the system.

Description of the Related Art

In recent years, image forming apparatuses such as Multi-Function Printers (MFPs) have become increasingly multi-functional, and it has become common for the image forming apparatuses to be connected to a server or a cloud service (hereinafter referred to as a "server") via the Internet to provide functions and services. An Internet of Things (IoT) system has become widespread, in which not only an image forming apparatus but also various objects such as a house, a building, a home electric appliance, an automobile, and an electronic apparatus are connected to a server as clients via the Internet. In the IoT system, for example, information obtained from a sensor mounted on a client is transmitted to a server, and the server collects, analyzes, and utilizes the information to provide added value to users of the service.

Unexpected amounts of data may be transmitted from a particular client due to hardware failure of client or a malfunctioning sensor, or the like. For example, data relating to the same event may be transmitted tens of thousands to hundreds of thousands of times per day due to abnormal detection by a sensor of the client. A large amount of abnormal data transmitted from the client causes to consume excessive resource of the server and stagnate processing of the server. As a result, processing for data from clients that have no anomalies may be delayed.

Japanese Patent Application Laid-Open No. 2020-145647 discloses that when a server determines that an amount of data received from a client per unit time exceeds a predetermined value, the server transmits a rule for controlling transmission to the client, and the client stops transmitting a part of data until the amount of data transmitted per unit time becomes equal to or less than the predetermined value based on the rule.

As described above, conventionally, when a client transmits abnormal data, the data transmission of the client is stopped. As a result, the server is not able to monitor a status of the client at all until the abnormality of the client is resolved.

SUMMARY

A system according to embodiments of the present disclosure includes one or more client terminals and a service that receives notices from the client terminal, the client terminal comprising a transmitting unit operable to execute: first transmission process to transmit a first notice to the service in real time, the first notice being information of an event generated in the client terminal; and second transmission process to transmit a second notice to the service, the second notice being information of an event to be transmitted in response to a result of a regularly check, in the client terminal, whether the event has been generated or not, and the service comprising a controller configured to execute: a first control to transmit a first data sending request to the client terminal when a frequency of the first notice received from the client terminal exceeds a first threshold within a first period of time, the first data sending request causing the transmitting unit of the client terminal to stop the first transmission process and to execute the second transmission process, and a second control to transmit a second data sending request to the client terminal when determined that a problem in the client terminal has been solved based on the second notice received from the client terminal instructed to stop the first transmission process by the first data sending request, the second request causing the transmitting unit of the client terminal to restart first transmission process.

Further features of the present disclosure will become apparent from the following descriptions of the exemplary embodiments with reference to the attached drawings.

BRIEF DESCRIPTION OF THE DRAWINGS

FIG. 4A shows a structure of various types of information processed by the status monitoring server.

FIG. 4C shows a structure of various types of information processed by the status monitoring server.

FIG. 4D shows a structure of various types of information processed by the status monitoring server.

FIG. 4F shows a structure of various types of information processed by the status monitoring server.

FIG. 6A is a flowchart showing processes executed by the status monitoring server according to one or more aspects of the present disclosure.

FIG. 7 shows a structure of a data sending request transmitted from the status monitoring server to the device according to one or more aspects of the present disclosure.

FIG. 9A is a flowchart showing processes for real-time events executed by the status monitoring server according to one or more aspects of the present disclosure.

FIG. 10A shows a data structure of the device information held by the status monitoring server according to one or more aspects of the present disclosure.

FIG. 10B shows a data structure of a data sending request transmitted from the status monitoring server to the device according to one or more aspects of the present disclosure.

FIG. 12 shows a user interface provided by the status monitoring server according to one or more aspects of the present disclosure.

DESCRIPTION OF THE EMBODIMENTS

Figure 1:
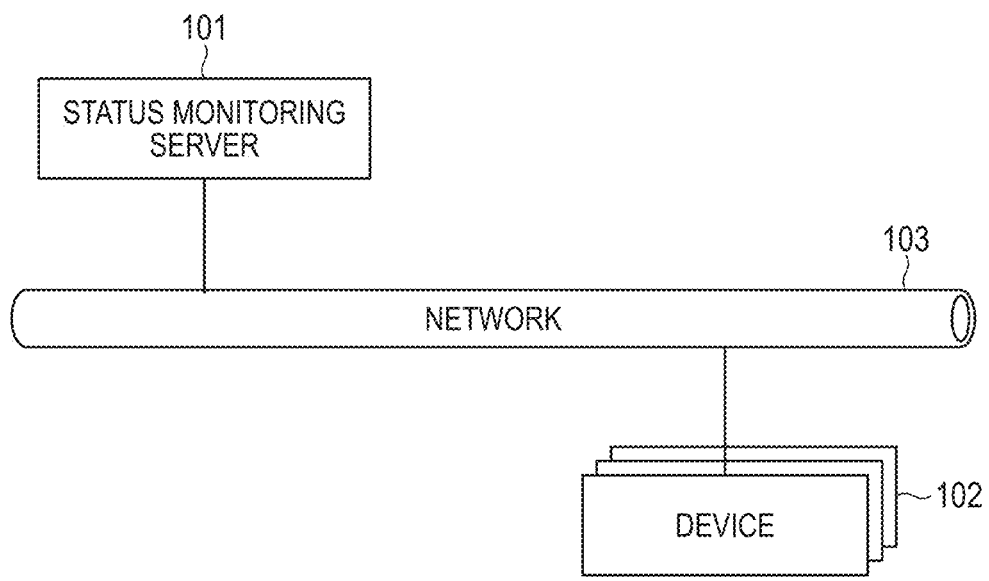
FIG. 1 shows the overall configuration of the system of the first embodiment.

Each embodiment will be described below with reference to the drawings. In the description of each embodiment, the same components as those of other embodiments may be indicated by the same reference numerals and the description thereof may be omitted.

First Embodiment

<System Configuration>

FIG. 1 shows an example of the overall configuration of the system according to an embodiment of the present disclosure. The system of this embodiment includes a status monitoring server (monitoring server) 101 and at least one device 102. In addition to the monitoring server 101, the system may include another server (not shown) that provides other functions. The device 102 can be, for example, one of various devices such as an image processing apparatus (image forming apparatus), a house and a building, a home electric appliance, an automobile, and electronic equipment.

The monitoring server 101 monitors errors that have occurred on the devices 102, amounts of expendables remaining, and provides alerts to a user when user action is required. The devices 102 detect an error or a warning generated in the devices 102 based on a sensor mounted on the devices 102, a consumption degree estimated from the total number of times the functions are used, and the like, and notify the monitoring server 101 of the detected error or warning. The monitoring server 101 receives event data from the device 102, and stores information that needs to be presented to the user as alert information based on the event data. In this embodiment, the devices 102 notify the monitoring server 101 of the event information directly. However, if there are other servers in addition to the monitoring server 101, a server may be provided to mediate communications between each server and the devices 102.

The monitoring server 101 is connected with the devices 102 via a network 103. The network 103 is, for example, a communication network realized by any one of the Internet, a LAN (Local Area Network), a WAN (Wide Area Network), a telephone line, or the like, or a combination thereof.

<Hardware Configuration of Information Processing Apparatus>

Figure 2:
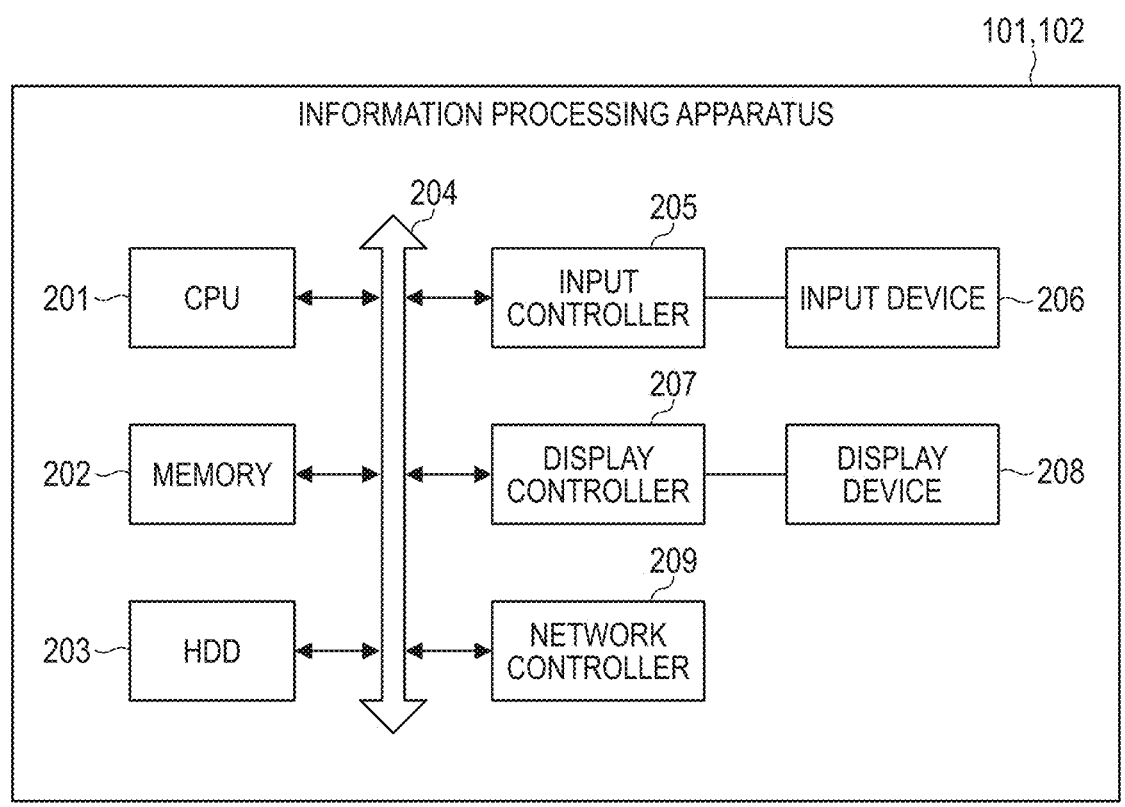
FIG. 2 shows a hardware configuration of a status monitoring server and a device.

FIG. 2 is a block diagram showing an example of a hardware configuration of an information processing apparatus constituting the monitoring server 101 and an image processing apparatus constituting the device 102. Each of the monitoring server 101 and the device 102 includes a central processing unit (CPU) 201, a memory 202, a hard disk drive (HDD) 203, a system bus 204, an input controller 205, an input device 206, a display controller 207, a display device 208, and a network controller 209.

The monitoring server 101 (the information processing apparatus) includes the CPU 201 for executing software stored in the HDD 203 or the like as a storage device. The CPU 201 collectively controls each hardware connected to the system bus 204.

The memory 202 functions as a main memory, a work area, and the like of the CPU 201. The HDD 203 is a nonvolatile storage area, and stores data as a mass storage device. each of the monitoring server 101 and the device 102 may include other storage devices such as a solid status drive (SSD) instead of or in addition to the HDD.

The input controller 205 controls inputs from the input device 206 such as a keyboard. The information processing apparatus may be configured not to include the input controller 205 and the input device 206. The display controller 207 controls display on the display device 208 such as a liquid crystal display. The information processing apparatus may be configured not to include the display controller 207 and the display device 208. The network controller 209 bidirectionally communicates data with other nodes via a network. The device 102 (image processing apparatus) may further include hardware specific to the image processing apparatus, such as a printer unit or a scanner unit (not shown).

The monitoring server 101 is realized by an information processing apparatus provided as a cloud computing service. The cloud computing can be serverless computing or virtual machines. The cloud computing utilizes multiple hardware resources shown in FIG. 2. The monitoring server 101 can be an on-premises server. The monitoring server 101 (information processing apparatus) may be realized by a single computer or multiple computers.

<Functional Configuration>

Figure 3:
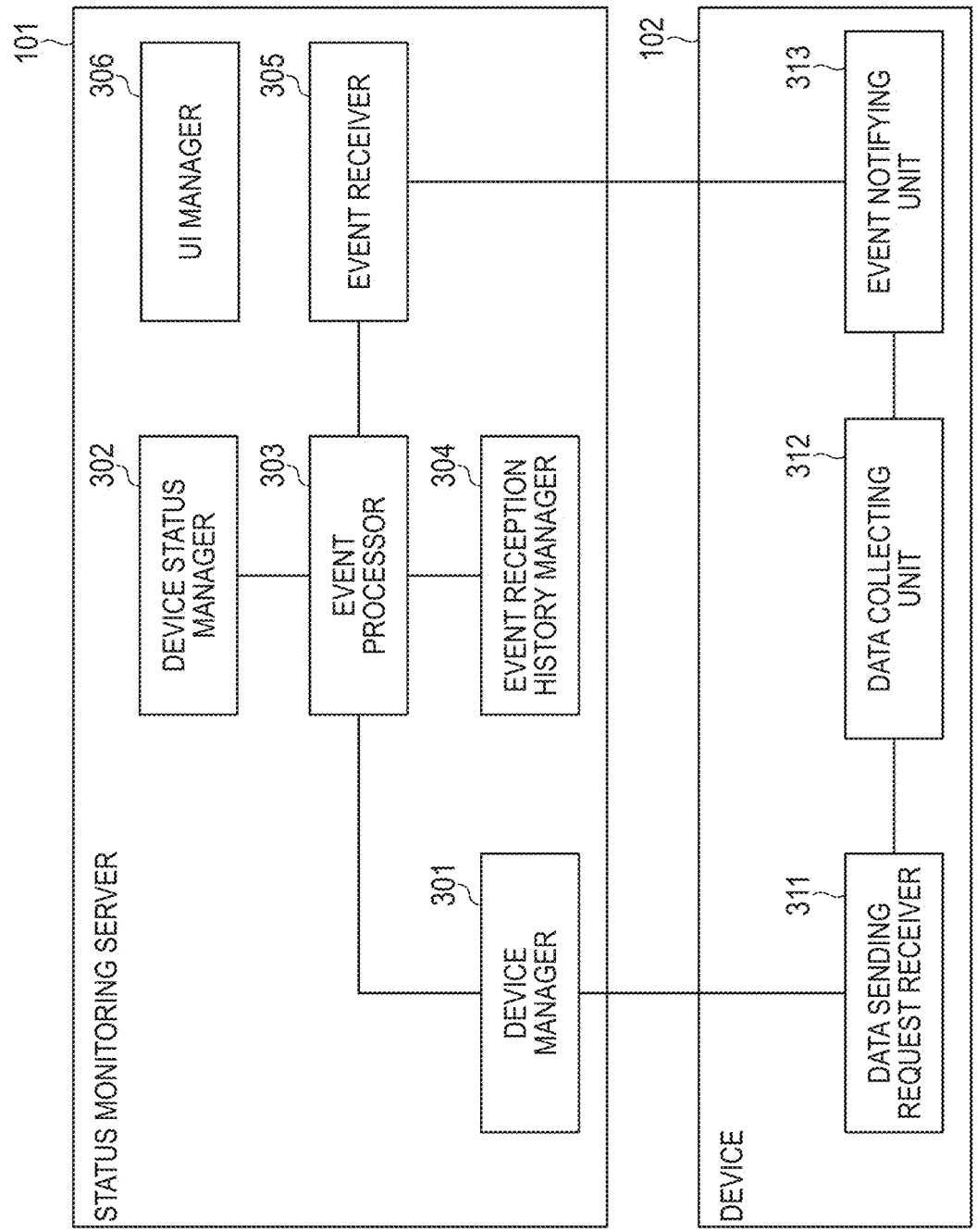
FIG. 3 shows a functional configuration of the status monitoring server and the device.
Figure 4B:
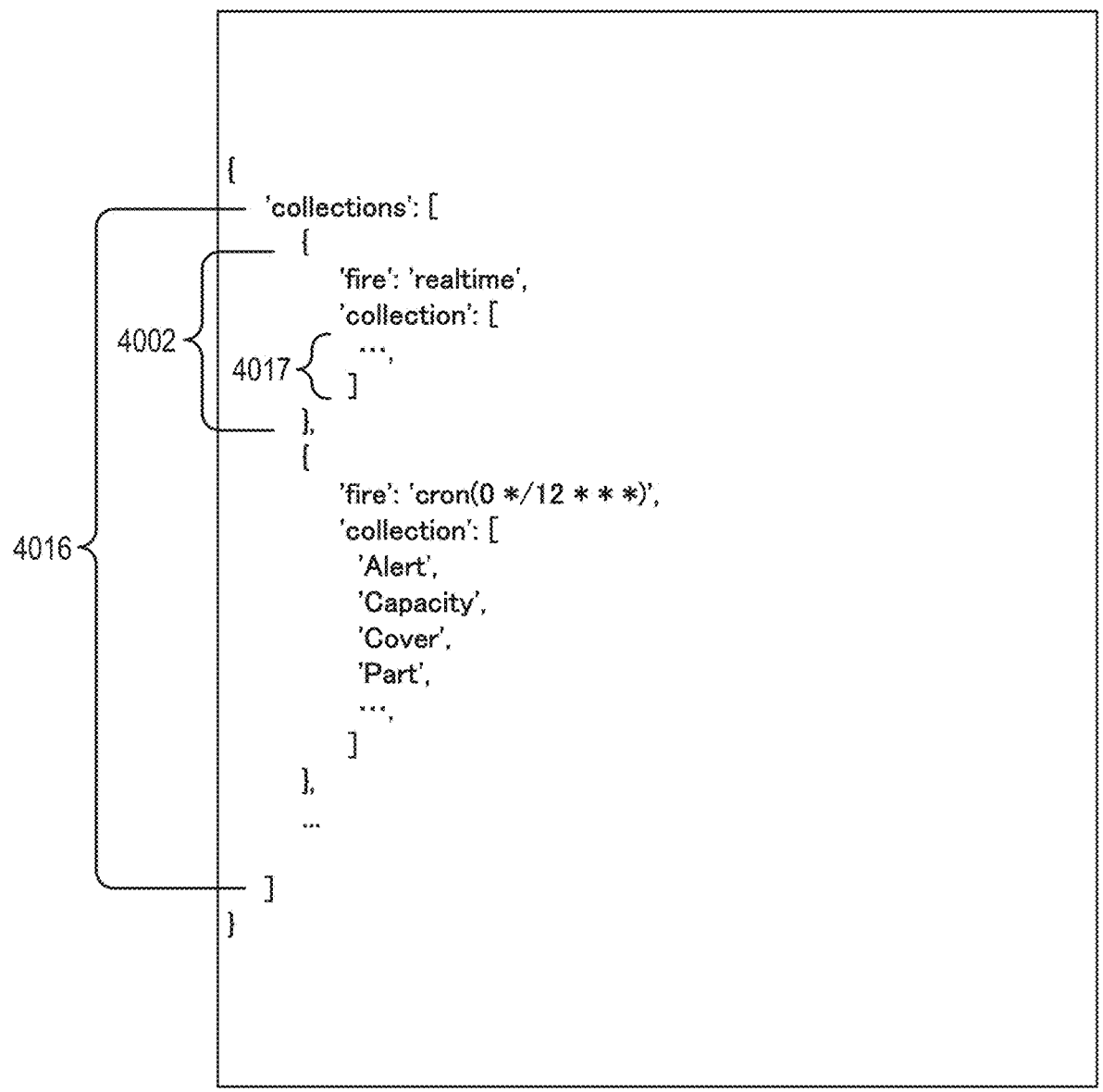
FIG. 4B shows a structure of various types of information processed by the status monitoring server.
Figure 4E:
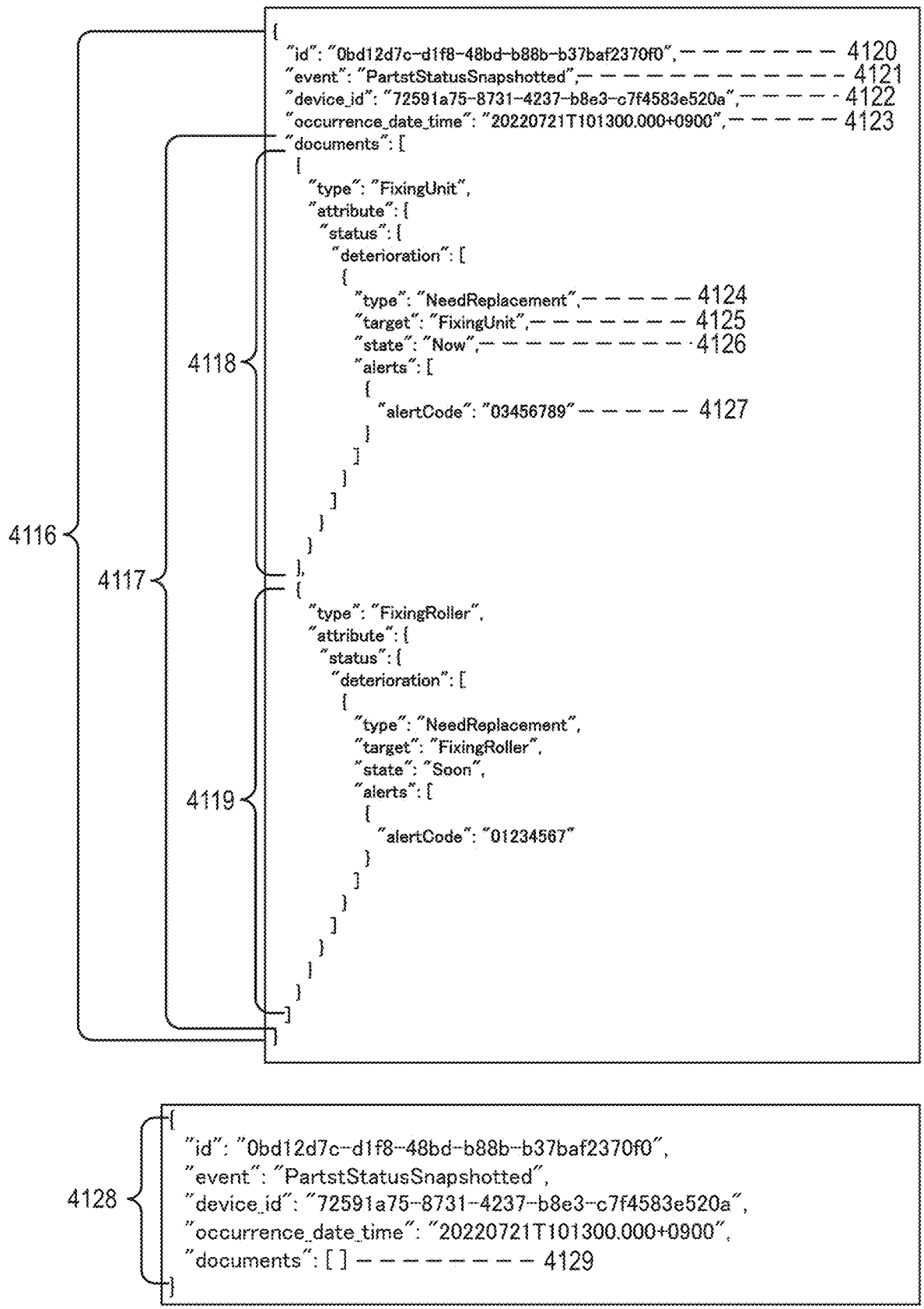
FIG. 4E shows a structure of various types of information processed by the status monitoring server.

FIG. 3 is a block diagram showing an example of functions of the monitoring server 101 and the device 102.

The monitoring server 101 provides functions to remotely monitor a status of the device 102 to manage the device 102. The functions provided by the monitoring server 101 shall be referred to as "service".

The monitoring server 101 includes a device manager 301, a device status manager 302, an event processor 303, an event reception history manager 304, an event receiver 305, and a UI manager 306. Each unit is implemented by the CPU 201 of the monitoring server 101 loading a program stored in the HDD 203 or the like into the memory 202 and executing the program as necessary.

The device manager 301 manages information about devices managed by the monitoring server 101. The devices managed by the device manager 301 may be added and deleted by sending instructions (not shown) to the monitoring server 101 for registering and deleting the devices. Alternatively, another server (not shown) may collectively manage the devices information, and the monitoring server 101 may manage those of the managed devices that are designated to be managed by the monitoring server 101.

The device manager 301 also transmits a data sending request to the device 102. The requested data includes an alert notice of the device 102. The alert notice includes, for example, level information of an error or warning, and information about an event such that a body cover of the devices 102 is not closed, a part needs to be replaced, expendables need to be replaced. The event data of the alert notice and the data structure of the data sending request transmitted to the device 102 are described below with reference to FIGS. 4A to 4F.

The device status manager 302 manages alert information that indicating a status of the device monitored by the monitoring server 101. The alert information is generated based on the event data of the alert notice received from the device 102. The alert information includes a time when the alert occurred, a location where the alert occurred, a type of the alert, a status of the alert, an alert level, and an alert code indicating details of the alert. The data structure of the alert information will be described later with reference to FIGS. 4A to 4F.

The event processor 303 acquires, from the event receiver 305, event data that the event receiver 305 receives from the device 102, and processes the event data. The event processor 303 interprets the event data, generates alert information of the device 102, transmits the alert information to the device status manager 302, and causes the device status manager 302 to store the alert information. The event processor 303 transmits event data to the event reception history manager 304, and causes the event reception history manager 304 to store the event data.

The event reception history manager 304 holds event data received from the device 102 as history information. The event reception history manager 304 receives, from the event processor 303, event data processed by the event processor 303, and stores the event data. The event reception history manager 304 receives an instruction from the event processor 303 to acquire event data generated within a predetermined period of time, and returns the event data to the event processor 303.

The event receiver 305 receives event data from the device 102 and holds the event data. The event receiver 305 provides event data in response to a request from the event processor 303. The data structure of the event data will be described later with reference to FIGS. 4A to 4F. The event data held as a history in the event reception history manager 304 has the same data structure as the event data held by the event receiver 305.

The UI manager 306 manages user interfaces (UI) provided by the monitoring server 101. The UI provided by the monitoring server 101 is used for a Web application that is displayed using a Web browser. The web application is configured using HTML that expresses a web page, CSS (Cascading Style Sheets) that is a style sheet, a programming language (for example, JavaScript (registered trademark)) that is operated on a web browser, and the like. The device information displayed on the UI is acquired from information held by the device manager 301 or the device status manager 302. The held information is acquired by the JavaScript running on the Web browser via an Application Programming Interface (API, not shown) provided by the monitoring server 101.

The device 102 includes a data sending request receiver 311, a data collecting unit 312, and an event notifying unit 313. Each unit is realized by the CPU 201 of the device 102 loading a program stored in the HDD 203 or the like into the memory 202 as necessary and executing the program.

The data sending request receiver 311 receives a data sending request from the monitoring server 101, and notifies the data collecting unit 312 of the data to be acquired that is specified by the received data sending request. The data collecting unit 312 holds the data to be collected that is received from the data sending request receiver 311, collects various data corresponding to the received request, and transmits the collected data to the event notifying unit 313. The event notifying unit 313 notifies the monitoring server 101 of the data collected by the data collecting unit 312.

For example, when the data sending request receiver 311 receives a request for collecting data including an alert notice, the data collecting unit 312 checks, periodically or at the assumable timing of the alert issued by the device 102, whether or not an alert has been issued from the device 102 according to the data sending request, and generates event data relating to the alert notice. The event notifying unit 313 notifies the monitoring server 101 of the generated event data.

<Data Structure>

FIGS. 4A to 4F show the structures of various types of data processed by the monitoring server 101. Hereinafter, FIGS. 4A to 4F may be collectively referred to as "FIG. 4". The data structures of data sending requests 4001, 4016 sent to the devices 102, the data structures of event data 4101, 4111, 4116, 4128 of the alert notice notified by the devices 102, and the data structures of device information 4201 and alert information 4207 both managed by the monitoring server 101 are shown below.

The device information 4201 and the alert information 4207 are stored in the HDD 203 of the monitoring server 101 in a form of JSON (JavaScript Object Notation) or XML (Extensible Markup Language). Alternatively, the device information 4201 and the alert information 4207 may be stored in an external database (not shown). Although the JSON format is shown as an example in this embodiment, the storage method and storage format according to the present disclosure are not limited to this embodiment.

The data structure of the data sending request transmitted from the monitoring server 101 to the device 102 is shown below. The data sending request 4001 is an example of data for requesting the devices 102 to transmit real-time events and regular events. The data sending request 4016 is an example of a request to stop the real-time events and to transmit only the regular events.

The data sending request 4001 defines a transmission request 4002 of transmitting real-time events and a transmission request 4003 of transmitting regular events.

In the transmission request 4002, a real-time event trigger condition 4006 indicates a fire condition of the event. In this example, "realtime" is specified as the trigger condition 4006. The parameter "realtime" indicates that an event is sent immediately when the event occurs. A notice target 4004 indicates classifications of the events that have occurred in the target to be notified in response to the transmission request 4002 of real-time events. In this example, the notice target 4004 identifies "Alert" (4007), "Capacity" (4008), "Cover" (4009), and "Part" (4010) as the classifications of the events.

The classification "Alert" (4007) is used to report a status of the device 102 as an alert when an error or warning is generated in the device 102. The classification "Capacity" (4008) is used to report a status of the device 102 as an alert when an error or warning relating to a capacity is generated. For example, the category "Capacity" (4008) may be used to report a status indicating that a receiving tray is full of output sheets, or to report an error or warning indicating that sheets in a cassette tray have run out and sheets needs to be replenished. The classification "Cover" (4009) is used to report a status of the device 102 as an alert when an error or warning about a cover being open or closed is generated. For example, the classification "Cover" (4009) is used to report an error or warning when a cover of a body of the device 102 is open or when a cover of a toner bottle is open. The classification "Part" (4010) is used to report a status of the device 102 as an alert when an error or warning relating to parts is generated. For example, if a part of the device 102, such as a fixing unit or fixing roller, becomes worn out and needs to be replaced, an error or warning is notified.

The transmission request 4002 is set to report an event in real time through the trigger condition 4006. Therefore, the device 102 immediately reports an event when the event matching the classification set by the notice target 4004 is generated.

In the transmission request 4003 of regular events, a trigger condition 4011 shows a fire condition of the event, as in the trigger condition 4006. The trigger condition 4011 specifies a condition "cron (0*/12* * *)". The condition "cron (0*/12* * *)" indicates that the event is reported at 0 minutes every twelve hours based on the cron format.

A notice target 4005 indicates classifications of events generated with respect to targets to be notified in response to the transmission request 4003 of regular events. In this example, similar to the transmission request 4002 of real-time events, the notice target 4005 identifies the classifications of events "Alert" (4012), "Capacity" (4013), "Cover" (4014), and "Part" (4015). The transmission request 4003 is set to report events periodically based on the trigger condition 4011. Thus, the device 102 checks the events generated in the device 102 at the timing of reporting the events. If an event matching the classification specified in the notice target 4005 is generated, the device 102 reports the event.

As described above, the alert information of the devices 102 to be processed by the monitoring server 101 is specified as a transmission request, and the device 102 reports the occurrence of the corresponding event based on the specified transmission request. In this example, settings relating to alerts are used as a transmission request. However, the transmission request may be configured such that the monitoring server 101 receives a notice when the devices 102 are powered on or powered off. The transmission request may also be configured such that the monitoring server 101 receives a notice when the hardware or software configuration of the devices 102 is changed.

The data sending request 4016 is used to request the device 102 to stop sending real-time events but send only regular events. A notice target 4017 in the transmission request 4002 of real-time events does not specify any events related to the alerts (i.e., the above-described classifications "Alert" (4007), "Capacity" (4008), "Cover" (4009), and "Part" (4010)) as the classifications of the events to be notified. The transmission request of regular events has the same data structure as the transmission request 4003 of the regular events described above.

In the processing to be described later, the monitoring server 101 sends a data sending request such as the data sending request 4016 to the device 102 when detecting abnormal transmissions of events by the device 102, and controls the device 102 not to send the event related to an alert causing the abnormal transmission. According to the above configuration, the event is not reported in real-time (i.e., at the timing of generating the event), but the event is reported at an interval of twelve hours specified in the transmission request 4003 of regular events.

Next, descriptions will be given of a data structure of event data relating to an alert to be notified from the device 102 to the monitoring server 101.

The event data 4101 indicates an example of real-time event data. The event data 4101 includes descriptions for reporting, based on the classification "Part" (4010) of the transmission request 4002 of real-time events described above, an alert indicating that a fixing unit, which is a part of the device 102, needs to be replaced.

An event ID 4103 is used to uniquely identify an event. An event name 4104 indicates a name of an event. A device ID 4105 is used to uniquely identify a device as a source of the event. An event time 4106 indicates time when the event was generated.

Document information 4102 corresponds to information associated with the event. The document information 4102 includes an alert type 4107, an alert target 4108, an alert status 4109, and an alert code 4110.

The alert type 4107 indicates a type of alert. In this example, the alert type 4107 indicates a type "NeedReplacement", that is, the need for replacement. The alert target 4108 indicates a target of the alert. In this example, the alert target 4108 indicates a target "FixingUnit", that is, a fixing device as a target of the alert. The alert target is changed depending on locations having the alert. That is, a parameter indicated via the alert target is changed depending on components (e.g., "FixingRoller" indicating a fixing roller) of the device 102.

The alert status 4109 indicates a status of the alert. In this example, the alert status 4109 shows "Now", indicating that the fixing unit needs to be replaced immediately. Another parameter, such as "Soon", may be set to alert status 4109 to indicate that a part needs to be replaced in a near future, but not immediately. The alert code 4110 indicates details of the alert. The alert code 4110 indicates a level of the alert (error, warning, service call), a source of generating the alert, and a type of the alert via a code having a hexadecimal number in each digit.

The event data 4111 indicates an example of data of real-time events as well as the event data 4101 described above. However, the event data 4111 shows an example of notifying that an event occurring in the device 102 has been resolved. In this example, it is reported that an alert shown in the event data 4101 indicating the necessity of replacing a fixing device has been resolved by a fact that a fixing device has been replaced. In the event data 4111, an alert type 4112 included in the document information is set to "NeedReplacement", an alert target 4113 is set to "FixingUnit", an alert status 4114 is blank, and an alert code 4115 is blank. The event data 4111 indicates that the necessity of replacing a fixing device has been resolved.

The event data 4116 is an example of data of regular events. The event data 4116 is used to report an error or a warning relating to a part generated in the device 102 via regular events notified every twelve hours based on the parameter of "Part" (4015) included in the transmission request 4003 of regular events described above. In this example, the event data 4116 is configured to report document information 4117 including an alert 4118 indicating the necessity of replacing a fixing device and an alert 4119 indicating the necessity of replacing a fixing roller.

Similar to the event data 4101, the event data 4116 includes an event ID 4120, an event name 4121, a device ID 4122, and an event occurrence time 4123. Similar to the document information 4102, the alert 4118 includes an alert type 4124, an alert target 4125, an alert status 4126, and an alert code 4127. The alert 4118 indicates that a fixing device needs to be replaced immediately. The alert 4119 indicates that a fixing roller will soon needs to be replaced.

The event data 4128 shows an example of the data of regular events, which is similar to the event data 4116. However, the event data 4128 indicates that no errors or warnings relating to parts have been generated in the device 102 at the timing of the regular event. As a result, the event data 4128 shows document information 4129 of the event that is set to be blank.

The device information 4201 is an example of information about the device 102 held by the monitoring server 101. The device information 4201 includes a device ID 4202 uniquely identifying the device 102, a device name 4203 indicating a name of the device, an installed location of device 4204, an IP address of device 4205, an event reception stop flag (stop flag) 4206 indicating whether receiving events from the device 102 has been stopped. The stop flag 4206 being "false" indicates that receiving events is not stopped. On the other hand, the stop flag 4206 being "true" indicates that receiving events is stopped.

The alert information 4207 is an example of information about the device 102 held by the monitoring server 101. The monitoring server 101 detects that an alert has been generated in response to receiving a notice of an event from the device 102, and generates alert information. In response to receiving the notice of the event from the device 102, the monitoring server 101 detects that the alert has been cancelled, and deletes the alert information. The monitoring server 101 may be configured to maintain the alert information as a history of alerts (not shown) and to provide past alert information when an alert is cancelled.

The alert information 4207 includes an alert ID 4210 uniquely identifying the alert, a device ID 4211 that identifies the device causing to generate the alert, an alert status 4208 indicating a status of the alert, and a time 4217 indicating when the alert was generated. The alert status 4208 includes an alert type 4212, an alert target 4213, an alert status 4214, and an alert list 4209. The alert list 4209 includes an alert code 4215 and an alert level 4216. The monitoring server 101 receives the event data 4101 relating to real-time events or the event data 4116 relating to regular events, and then generates information such as the alert information 4207 based on the received event data.

The association between the alert information and the event information is described below. As an example, the association between the alert information 4207 and the event data 4101 of real-time events is described. In the alert information 4207, the alert ID 4210 is generated based on a combination of the device ID 4105, the alert type 4107, and the alert target 4108 of the event data 4101 of real-time events. Using the combination allows to uniquely determine the event occurring in the device 102. A universally unique identifier (UUID) may be used to generate a new and unique ID, and the generated ID may be set as an alert ID. The device ID 4105 of the event data 4101 relating to real-time events is set in the device ID 4211.

The alert type 4212, the alert target 4213, and the alert status 4214 included in the alert status 4208 are set to the alert type 4107, the alert target 4108, and the alert status 4109 included in the document information 4102 of the event data 4101 relating to of real-time events, respectively. The alert code 4215 of the alert list 4209 is set to the alert code 4110 of the document information 4102 of the event data 4101 relating to real-time events. The alert level 4216 may be determined by interpreting the alert code 4110. For example, the first two digits of the code indicate the alert level, and the code '03' indicates a status of the error. The code system is not limited to this embodiment. The code system may be defined based on the standard specification such as a specification of the device 102 or an RFC (Request for Comments). The time 4217 indicating when the alert was generated is set to the event time 4106 indicating when the event data 4101 of real-time events is generated.

<User Interface>

Figure 5:
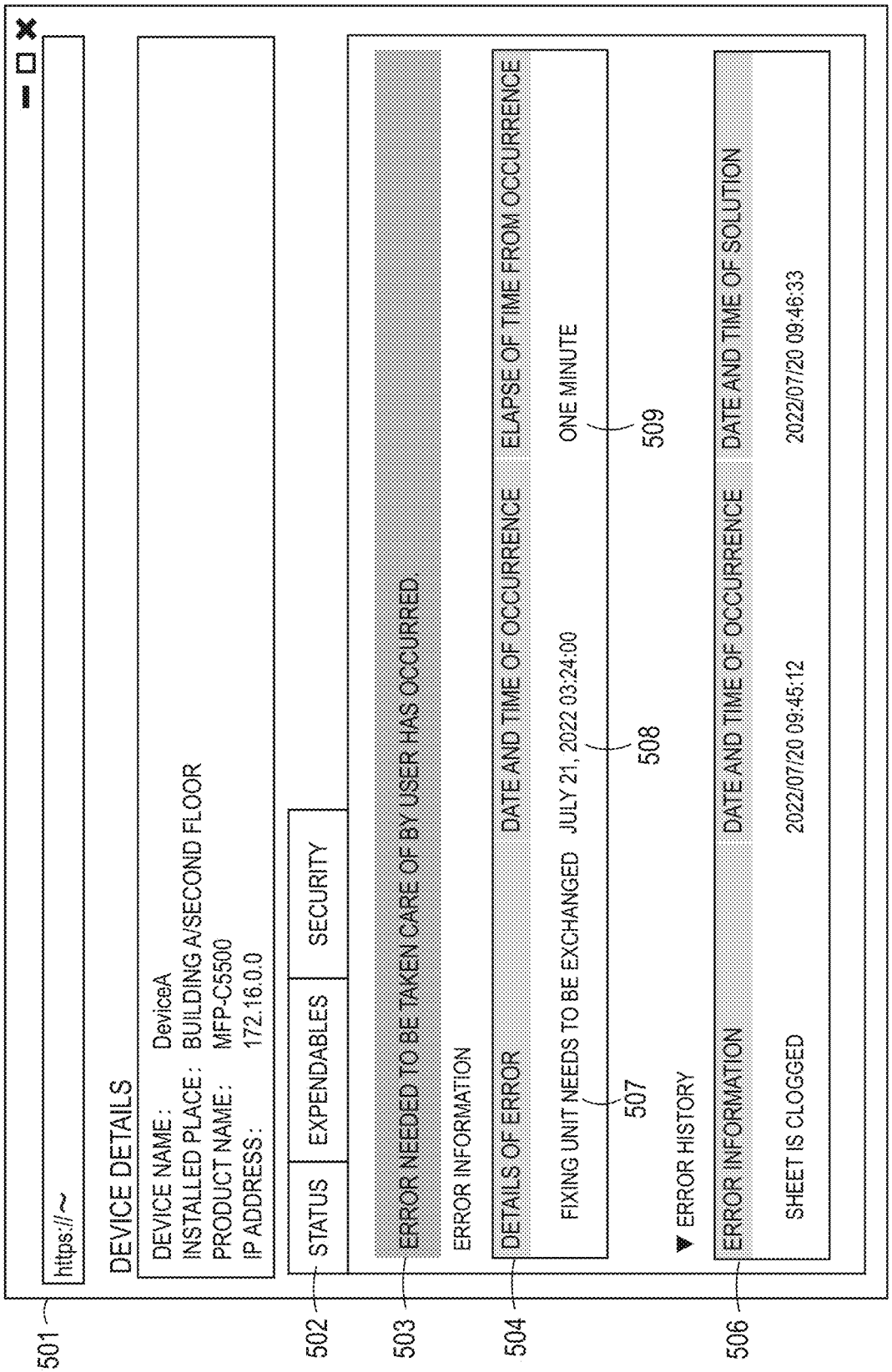
FIG. 5 shows a user interface provided by the status monitoring server according to one or more aspects of the present disclosure.

FIG. 5 shows an example of the UI provided by the UI manager 306 of the monitoring server 101. A UI 501 of device details includes basic information of a device, a status tab 502, a tab of expendables, and a security tab. In this example, the status tab 502 is selected, and the operation status of the device is displayed in the status tab.

An error message 503 is a message indicating that a user needs to deal with the error, such as an operator call or a service call. Device error information 504 displays an error message 507, an error generation time 508 indicating when the error occurred, and a time 509 elapsed after the occurrence of the error. This error information is displayed based on the alert information 4207 of FIG. 4 acquired from the monitoring server 101 via an API (not shown).

The error message 507 displays a predefined message determined based on the alert type 4212, the alert target 4213, and the alert status 4214 of the alert information 4207. The error generation time 508 displays the alert generation time 4217 of the alert information 4207. The time 509 displays a time difference between the time when the screen of the UI 501 was displayed and the error generation time 508. When the alert level 4216 of the alert information 4207 indicates an error, the background of the error message 503 is displayed in red. When the alert level 4216 indicates a warning, the background is displayed in yellow.

The device error information 504 may immediately shows a status of the device based on real-time events. When the real-time event has been stopped, the device error information 504 periodically shows a status of the device based on the regular events.

An error history 506 shows error information generated in the past. Similar to the alert information 4207, the error history 506 is displayed based on alert history information (not shown) acquired from the monitoring server 101 via an API (not shown).

<Process of Detecting Resolution of Abnormality>

Figure 6B:
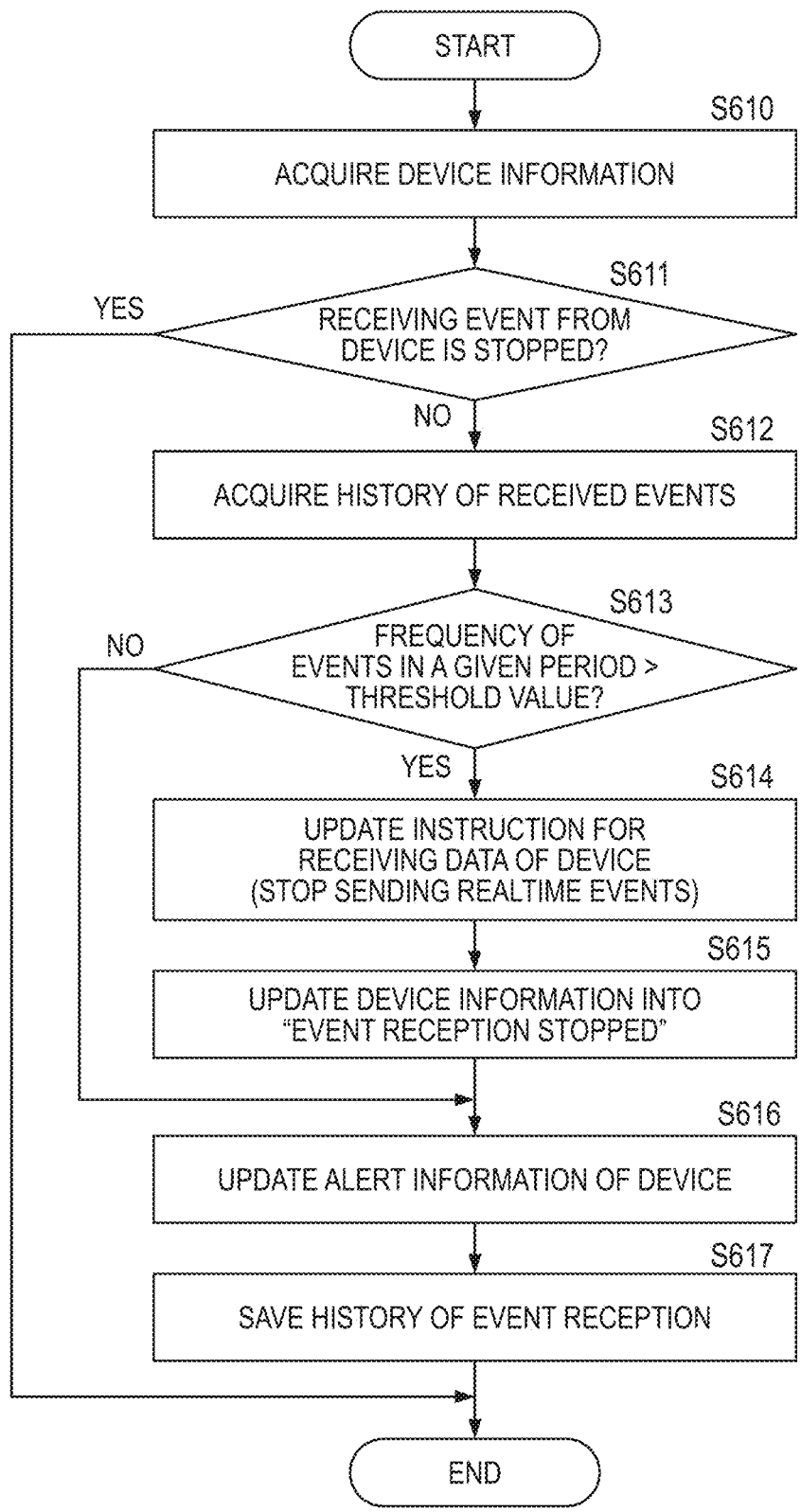
FIG. 6B is a flowchart showing processes executed by the status monitoring server according to one or more aspects of the present disclosure.
Figure 6C:
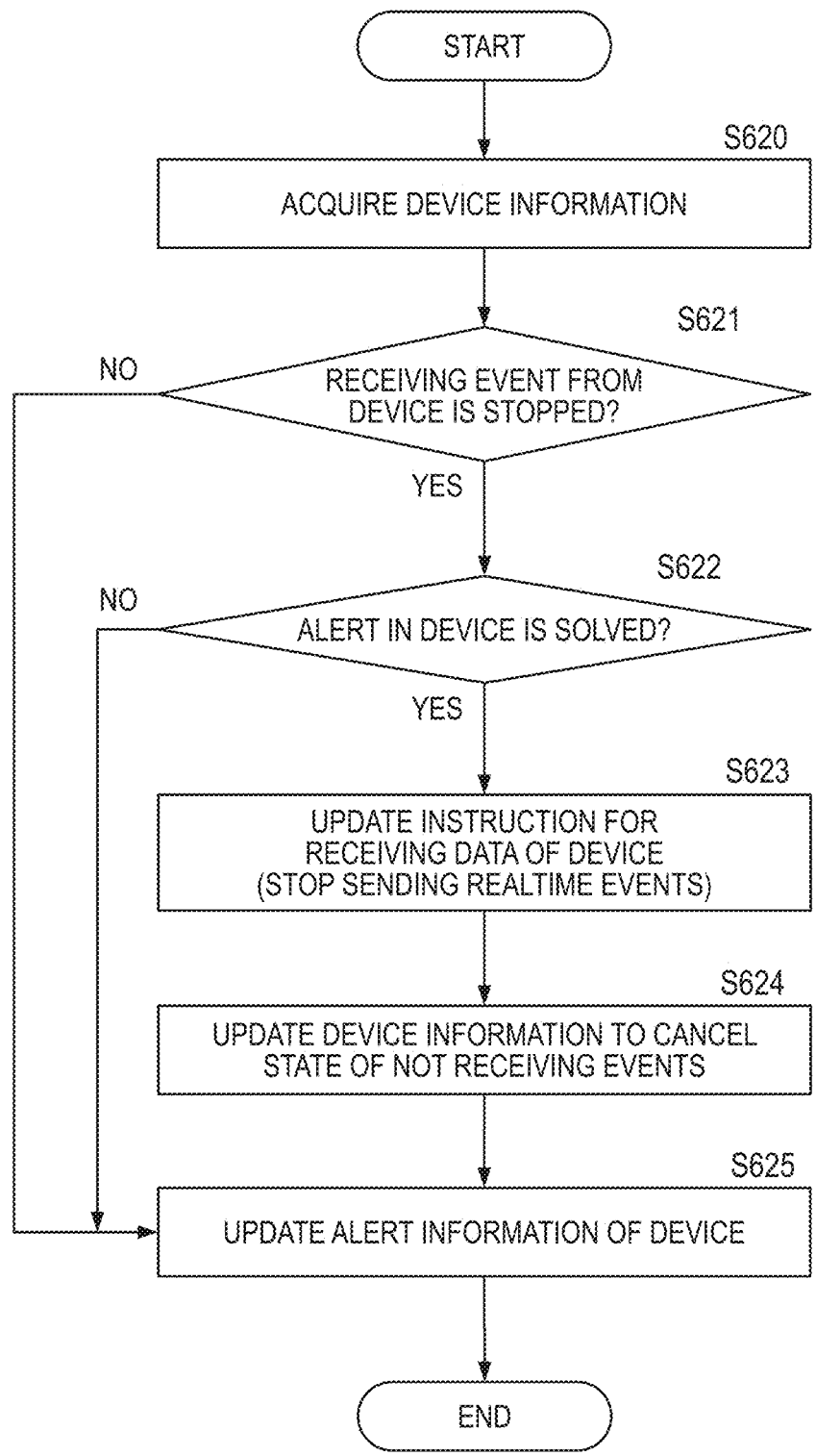
FIG. 6C is a flowchart showing processes executed by the status monitoring server according to one or more aspects of the present disclosure.

FIGS. 6A to 6C are flowcharts showing an example of processing performed when the monitoring server 101 of the first embodiment receives event information from the device 102. Hereinafter, FIGS. 6A to 6C may be collectively referred to as "FIG. 6". The processing of this flowchart is realized by the central processing unit 201 of the monitoring server 101 (information processing apparatus) loading a program stored in the HDD 203 or the like into the memory 202 as necessary and executing the program.

When determined that an abnormal number of events have been received from the device 102 in a process of receiving notices of real-time events, the monitoring server 101 instructs the device 102 to stop real-time events. The monitoring server 101 also instructs the device 102 to start real-time events when determined based on regular events that the cause of the abnormality has been resolved. The above processing is described in detail below.

The processing of the flowchart of FIG. 6A is started when the event receiver 305 of the monitoring server 101 receives an event sent from the devices 102. In response to receiving the event data from the device 102, the event receiver 305 notifies the event processor 303 of the received event data. The event receiver 305 may be configured to store received event data (not shown) in a queue and provide the event data to the event processor 303 in response to periodic inquiries from the event processor 303.

In step S601, the event processor 303 interprets the event data received from the event receiver 305, and determines whether the event data corresponds to a real-time event or not. More specifically, the event processor 303 first refers to an event name of the event data. In the example of the event data 4101 shown in FIG. 4, the event processor 303 refers to the event name 4104. In the example of the event data 4116 shown in FIG. 4, the event processor 303 refers to the event name 4121. Then, the event processor 303 determines based on the event name whether the event data is a real-time event or a regular event. For example, in the case of the event data 4101, the event processor 303 determines based on the event name 4104 "PartStatusChanged" that the event data corresponds to a real-time event reporting that a status of the part has been changed. In the case of the event data 4116, the event processor 303 determines based on the event name 4121 "PartStatusSnapshotted" that the event data corresponds to a regular event reporting a status of the part.

The real-time event is an event notified based on classifications such as "Alert" (4007), "Capacity" (4008), "Cover" (4009), and "Part" (4010), which are designated as the notice targets 4004 via the transmission request 4002 of the data sending request 4001. In the example of FIG. 4, the event data 4101, 4111 correspond to the real-time events. The regular event is an event notified based on classifications such as "Alert" (4012), "Capacity" (4013), "Cover" (4014), and "Part" (4015), which are designated as the notice targets 4005 via the transmission request 4003 of the data sending request 4001. In the example of FIG. 4, the event data 4116, 4128 correspond to the regular event. Mapping information (not shown) between each classification and the corresponding event name can be held by the event processor 303.

When determined that the event data is a real-time event (Yes in step S601), the event processor 303 advances the processing to step S602. The real-time event processing executed in step S602 is a process to be performed when a real-time event is received. The details of the processing will be described later with reference to steps S610 to S617 of FIG. 6B. On the other hand, when determined that the event data is a regular event (No in step S601), the event processor 303 advances the processing to step S603. The regular event processing executed in step S603 indicates a process to be performed when a regular event is received. The details of the processing will be described later with reference to step S620 to S625 of FIG. 6C.

With reference to FIG. 6B, the processing for real-time events executed in step S602 is described below. FIG. 6B is a flowchart showing the processing for real-time events according to the first embodiment.

In step S610, the event processor 303 specifies the device ID of the received event data (the device ID 4105 in the example of the event data 4101), and requests device information corresponding the device ID to the device manager 301. In response to receiving the request, the device manager 301 returns the device information corresponding to the specified device ID to the event processing 303. For example, the device manager 301 returns device information such as the device information 4201.

In step S611, the event processor 303 refers to the event reception stop flag (the stop flag 4206 in the example of the device information 4201) of the device information acquired in step S610, and determines whether receiving events from the device 102 has been stopped. When the stop flag indicates "false", the event processor 303 determines that receiving the events has not been stopped. On the other hand, when the stop flag indicates "true", the event processor 303 determines that receiving the events has been stopped.

When determined that receiving the events has been stopped (Yes in step S611), the event processor 303 does not process the received event, and ends the processing of this flowchart. The device 102 should not send real-time events while the monitoring server 101 stops receiving events. However, in this process, it is considered that an event can be received from the device 102 during a period of time until the device 102 receives an instruction to stop sending events.

On the other hand, when determined that receiving the events has not been stopped (No in step S611), the event processor 303 advances the processing to step S612. In step S612, the event processor 303 acquires from the event reception history manager 304 the past event history notified from the device corresponding to the device ID included in the received event data.

In step S613, the event processor 303 determines based on the event history acquired in step S612 whether a frequency of events received from the device within a certain period exceeds a threshold value. The period and threshold are predetermined, and not limited to particular values. For example, the predetermined parameter may be set as 1000 events per hour. The parameter considered as abnormal may be set based on the properties of the devices and events. The process related to the acquisition of the event history may be executed to acquire all event information corresponding to the device ID, or may be executed to acquire event information generated within a specified period. Alternatively, only the events satisfying a predetermined condition may be counted.

If the frequency of events received from the device within the predetermined period does not exceed the threshold value (No in step S613), the event processor 303 advances the processing to step S616. On the other hand, if the frequency of events received from the device within the predetermined period exceeds the threshold value (Yes in step S613), the event processor 303 determines that events have been received an abnormal number of times from the device 102, and advances the processing to step S614.

In step S614, the event processor 303 instructs the device manager 301 to stop the real-time events. Specifically, the event processor 303 instructs the device manager 301 to transmit a request such as the data sending request 4016 to the device 102 for causing the devices 102 to stop transmitting real-time events and to transmit only regular events. In response to an instruction from the event processor 303, the device manager 301 transmits a request such as the data sending request 4016 of FIG. 4 to the device 102.

In step S615, after transmitting the data sending request to the device 102, the device manager 301 updates the event reception stop flag (the stop flag 4206 in the example of the device information 4201) included in the information of the device corresponding to the device ID included in the received event data to "true" indicating that receiving events is to be stopped.

In step S616, the event receiver 305 stores alert information based on the received event data. That is, the event receiver 305 instructs the device status manager 302 to generate and store information such as the alert information 4207 based on the received event data.

In step S617, the event processor 303 instructs the event reception history manager 304 to store the received event data. More specifically, the event processor 303 instructs the event reception history manager 304 to hold the received real-time events as the event information received in the past so that the event reception history manager 304 can return the real-time events in response to the request generated in step S612.

Referring to FIG. 6C, the processing for regular events executed in step S603 is described below. FIG. 6C is a flowchart showing the processing for regular events according to the first embodiment. In step S620, the event processor 303 specifies the device ID of the received event data (the device ID 4122 in the example of the event data 4116), and requests the device manager 301 to provide device information corresponding to the device ID. In response to the request, the device manager 301 returns the device information corresponding to the specified device ID to the event processor 303. For example, the device manager 301 returns information such as the device information 4201.

In step S621, the event processor 303 refers to the event reception stop flag (the stop flag 4206 in the example of the device information 4201) of the device information acquired in step S620, and determines whether receiving events from the device 102 has been stopped. When determined that receiving events has not been stopped (No in step S621), the event processor 303 advances the processing to step S625 and updates the alert information. On the other hand, when determined that receiving events has been stopped (Yes in step S621), the event processor 303 advances the processing to step S622.

In step S622, the event processor 303 refers to the received event data, and determines whether the alert of the device has been resolved. Specifically, the event processor 303 refers to the document information of the received event data (the document information 4117 in the example of the event data 4116, and the document information 4129 in the example of the event data 4128). If alert information is included as shown in the document information 4117, the event processor 303 determines that the alert of the device has not been resolved. On the other hand, if the alert information is not included as shown in the document information 4129, the event processor 303 determines that the alert of the device has been resolved.

When determined that the alert has not been resolved (No in step S622), the event processor 303 advances the processing to step S625 to update the alert information. On the other hand, when determined that the alert has been resolved (Yes in step S622), the event processor 303 advances the processing to step S623.

In step S623, the event processor 303 instructs the device manager 301 to start transmitting real-time events. Specifically, the event processor 303 instructs the device manager 301 to transmit a request such as the data sending request 4001 of FIG. 4 to the device 102 for controlling the device 102 to start transmitting real-time events. In response to an instruction from the event processor 303, the device manager 301 sends the data sending request to the device 102.

In step S624, the device manager 301 transmits the data sending request to the device 102, and updates the event reception stop flag (the stop flag 4206 in the example of the device information 4201) included in the device information corresponding to the device ID included in the received event data to "false" indicating that events are to be received.

In step S625, the event receiver 305 stores alert information based on the received event data. That is, the event receiver 305 instructs the device status manager 302 to generate and store information such as the alert information 4207 based on data relating to regular events such as the event data 4116.

As described above, when determined that real-time events are received an abnormal number of times from the devices 102, the monitoring server 101 requests the devices 102 to stop sending the real-time events and to send only regular events. When determined that the alert has been resolved based on received regular events, the monitoring server 101 requests the device 102 to restart sending real-time events.

When events are received an abnormal number of times from the device 102, controlling the monitoring server 101 to receive only regular events allows to keep monitoring devices while mitigating an impact on the processing capacity of the monitoring server 101 due to receiving notices with abnormal frequency. In addition, the monitoring server 101 monitoring regular events and determining resolutions of problems that the devices had allows the monitoring server 101 to instruct the devices to restart sending real-time events.

Second Embodiment

According to the first embodiment, when an abnormal frequency of notices relating to events are detected from the device 102, a request, such as the data sending request 4016 of FIG. 4, is sent to the device 102 to instruct the device 102 to stop sending real-time events and send only regular events. In the first embodiment, the trigger condition of regular events included in the data sending request 4016 is set to send notices every twelve hours as in the case where the real-time events are allowed to be transmitted. In this case, an inconsistency may be created between the alert information held by the device 102 and the alert information held by the monitoring server 101 because of the regular events having large intervals of transmission.

In the second embodiment, the transmission intervals of regular events while the transmission of real-time events is stopped is set to be shorter than the transmission intervals of the regular events when the real-time events are allowed to be transmitted. The above configuration allows to reduce the negative effect caused by the inconsistency between the alert information held by the devices 102 and the alert information held by the monitoring server 101 even when the monitoring server 101 receives only the regular events. In the second embodiment, only the differences from the first embodiment are described. The configuration and processing that are not particularly specified are the same as those of the first embodiment.

<Data Structure>

Figure 7:
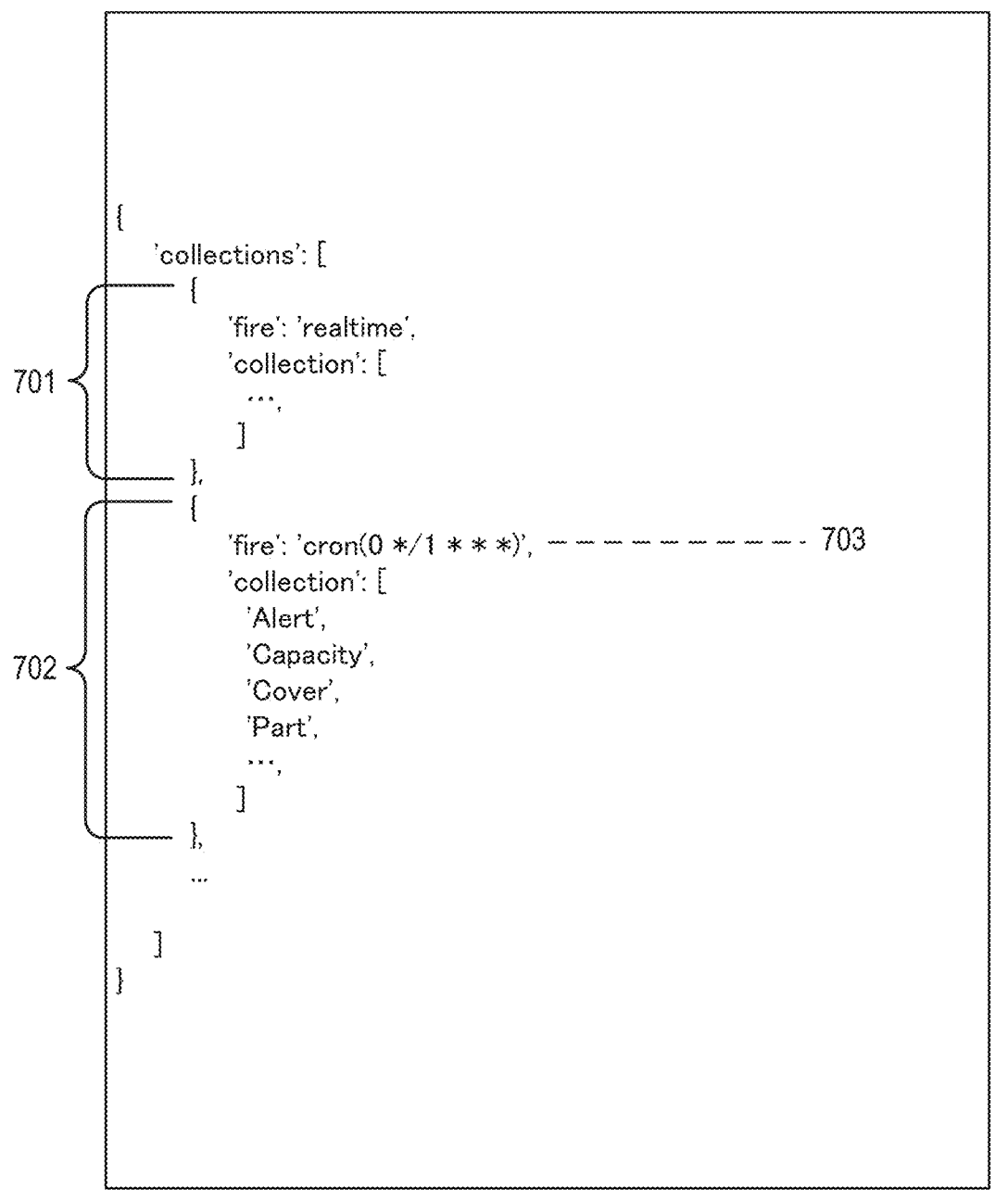

FIG. 7 shows a data sending request transmitted from the monitoring server 101 of the second embodiment to the device 102.

The data sending request shown in FIG. 7 is used to request the device 102 to stop sending real-time events and to request the device 102 to send only regular events when detecting an abnormal frequency of notices transmitted from the device 102. This request indicates that, similarly to the data sending request 4016 shown in FIG. 4, the events related to the alert are not set in the classifications of the events to be notified that are specified by a transmission request 701 of real-time events. That is, this request does not specify the above-mentioned classifications "Alert" (4007)), "Capacity" (4008), "Cover" (4009), and "Part" (4010) in the transmission request 701 of real-time events. If the alert is cleared, sending real-time events is restarted, and the intervals for sending regular events are restored (restored to the intervals of every twelve hours in the example described above).

The event trigger condition included in the transmission request of regular events is set to "cron (0*/1 * * *)". That is, the regular events are set to be transmitted at intervals of every hour while sending real-time events is stopped. However, the intervals may be set to be shorter or longer than the one-hour interval. While sending real-time events is stopped, the intervals for reporting regular event are set to be shorter than the intervals in the case where sending real-time events is not stopped (i.e., the intervals of every twelve hours in the example of FIG. 4). This configuration allows to reduce an impact of the inconsistency of the alert information between the device 102 and the monitoring server 101 caused by not receiving the real-time events.

Third Embodiment

In the first and second embodiments, when notices of events with abnormal frequency are detected, the transmission of real-time events associated with the alert is stopped, and the above real-time events are not limited to a specific real-time event. That is, the transmission request 4002 of real-time events included in the data sending request 4016 of FIG. 4 and the transmission request of real-time events included in the data sending request of FIG. 7 do not specify the classifications "Alert", "Capacity", "Cover", and "Part". An abnormal frequency of notices may be generated due to the failure of some parts of the device 102 or the false detection of certain sensors. In this case, an abnormal frequency of notices is generated due to a specific event only.

In the third embodiment, the above-described case is considered, and the transmission of all events related to the alert is not stopped, which is contrary to the first and second embodiments. In the third embodiment, it is determined for each classification of the event whether or not the device has a problem, and the transmission of the event is stopped only for the classification of the specific event having the problem. That is, events having no problem are processed normally. In this embodiment, only the differences from the first and second embodiments are described. The configurations and processes which are not specifically shown are the same as those of the first and second embodiments.

<Data Structure>

Figure 8:
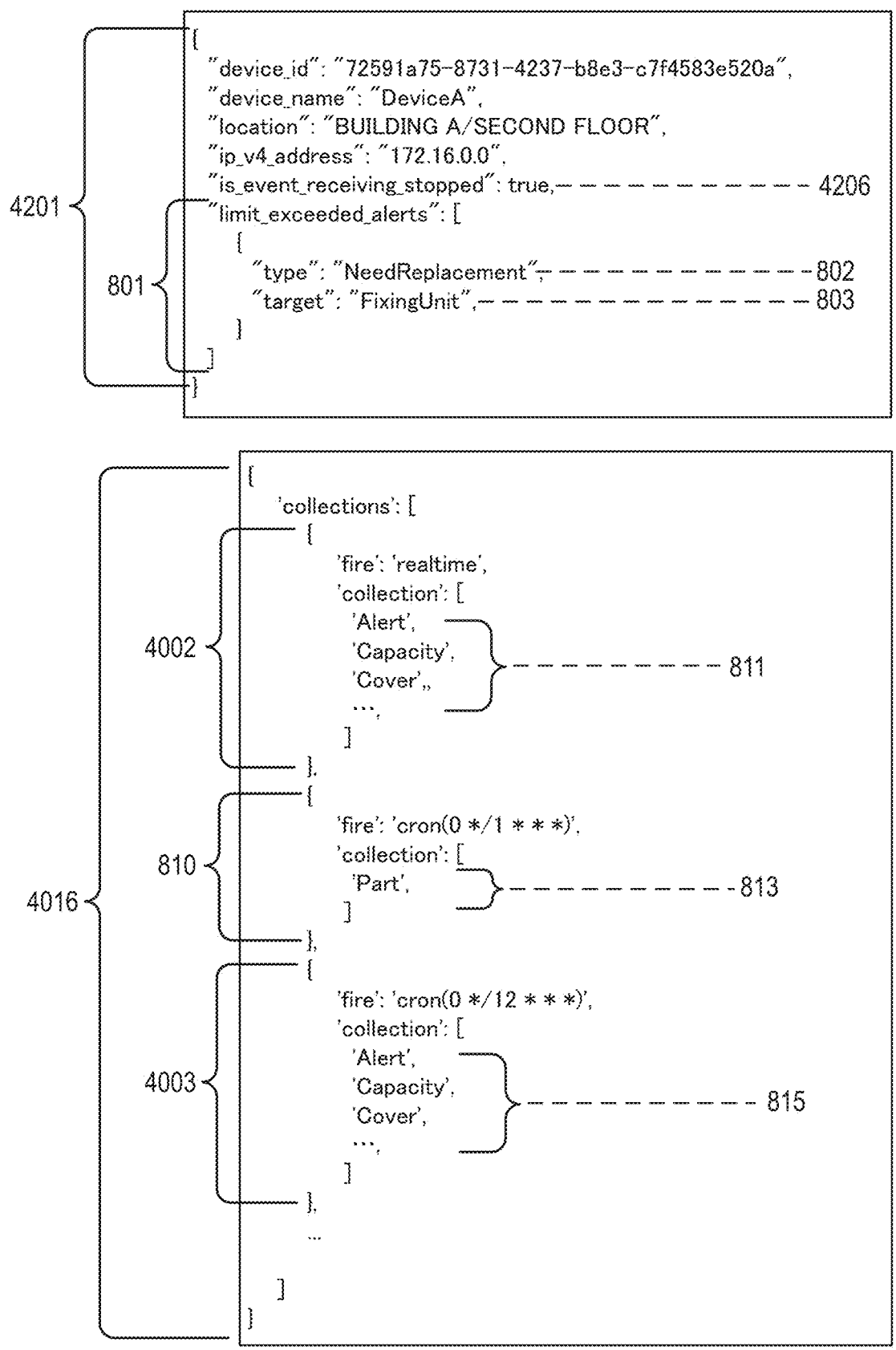
FIG. 8 shows a structure of information held by the status monitoring server according to one or more aspects of the present disclosure.

FIG. 8 shows the device information held by the monitoring server 101 according to the third embodiment and the data structure of the data sending request transmitted to the devices 102.

First, the device information is described below. In the example of the device information of the present embodiment, a list 801 of alert information including events for which transmission should be stopped is added to the device information 4201 of FIG. 4.

The list 801 holds alert information including events to be stopped from being sent. The list 801 holds information of alerts for which it is determined that notices are received with abnormal frequency from the device 102 by the process shown in FIG. 9A described later. The alert information added to the list 801 indicates events for which transmission by the device 102 is stopped. When determined that the alert has been resolved by the processing shown in FIG. 9B described later, the alert information is deleted from the list 801.

The list 801 includes an alert type 802 and an alert target 803 of alert information for which it has been determined that notices are sent with abnormal frequency. The list 801 holds parameters of an alert type and an alert target (the alert type 4107 and the alert target 4108 in the example of the event data 4101 of real-time events) notified via real-time events. In this example, it is considered that real-time event data 4101 of FIG. 4 are notified with abnormal frequency, and the alert type 802 identifies a parameter "NeedReplacement" and the alert target 803 identifies a parameter "FixingUnit".

In the third embodiment, a data sending request transmitted to the device 102 is described below. In this example, it is considered that the event data 4101 of real-time events of FIG. 4 is notified with abnormal frequency, and the event "PartStatusChanged" classified into "Part" is described below.

A classification 811 indicates the classifications of real-time events to be transmitted when the transmission of real-time events is stopped. The data sending request 4016 specifies the classification 811. In the first and second embodiments, all of the classifications "Alert", "Capacity", "Cover", and "Part" are excluded from the events to be transmitted (the target 4017). However, in this example, only the classification "Part" regarded to be associated with the abnormal notices is excluded from the objects to be transmitted.

A transmission request 810 of regular events specifies the classification "Part" considered to be associated with the abnormal notices in a classification 813 as the event to be transmitted as a regular event. Similar to a condition 703 described in the second embodiment, the transmission request 810 of regular events in this example specifies intervals of one hour as an event trigger condition. A classification 815 included in the transmission request 4003 of regular events specifies the classifications "Alert", "Capacity", and "Cover" other than the classification "Part" regarded to be associated with abnormal notices. The transmission request 4003 of regular events specifies intervals of every twelve hours as an event trigger condition.

<Process of Detecting Resolution of Abnormality>

Figure 9B:
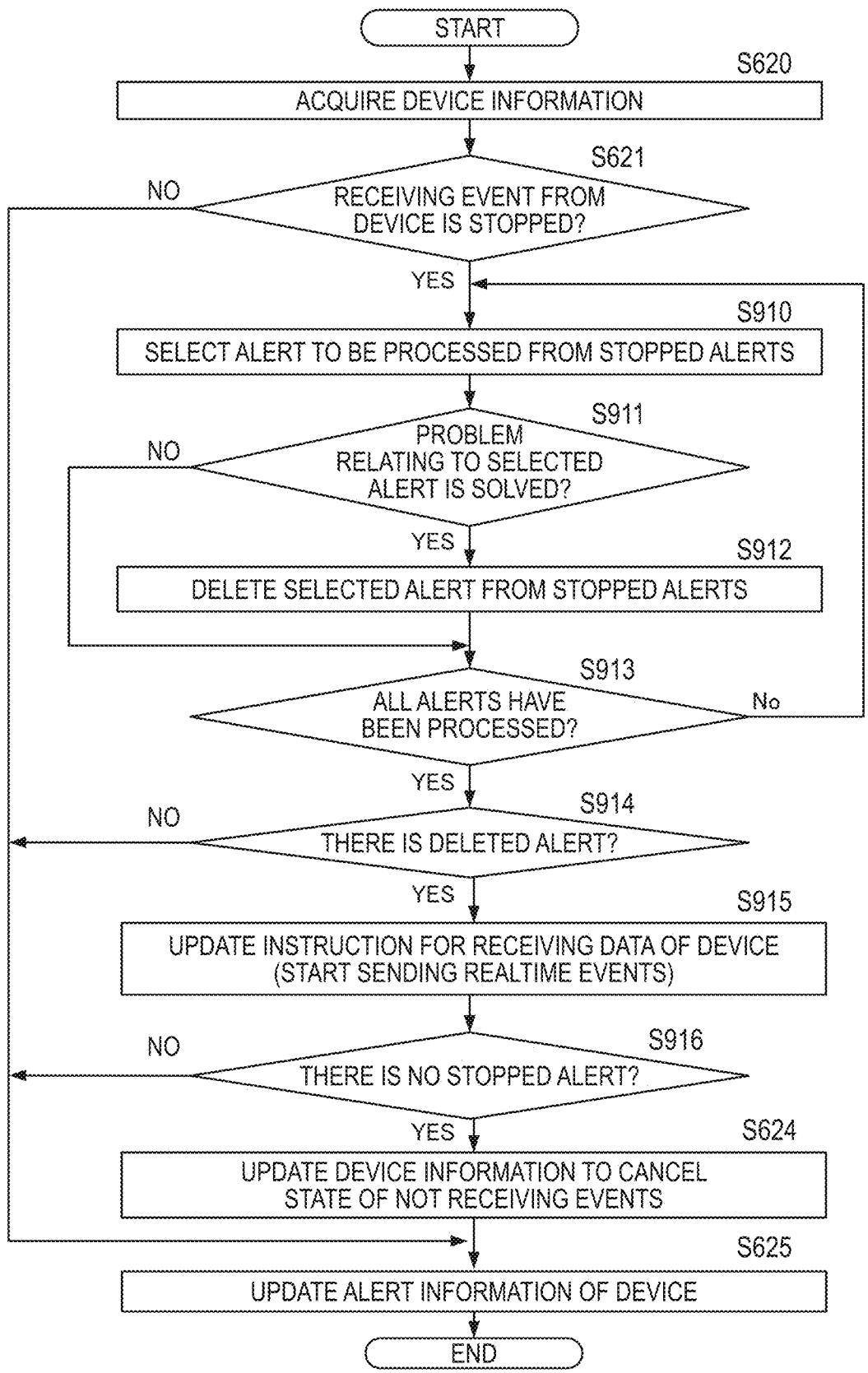
FIG. 9B is a flowchart showing processes for regular events executed by the status monitoring server according to one or more aspects of the present disclosure.

With reference to FIGS. 9A and 9B, the processing of the monitoring server 101 according to the third embodiment will be described below. The processing of the flowcharts shown in FIGS. 9A and 9B is realized by the central processing unit 201 of the monitoring server 101 (information processing apparatus) loading a program stored in the HDD 203 or the like into the memory 202 as necessary and executing the program.

FIG. 9A is a flowchart showing processing for real-time events according to the third embodiment. Contrary to the first embodiment and the second embodiment, it is determined in this embodiment whether or not notices are transmitted with abnormal frequency for each event, and the transmission of events regarded to be associated with abnormal notices is stopped. In FIG. 9A, the processing indicated by the same symbols as in FIG. 6B is same as the processing shown in FIG. 6B, and the descriptions thereof are omitted.

When determined that receiving events from the device 102 has been stopped (No in step S611), the event processor 303 of the present embodiment advances the processing to step S901. The received event data is described using the symbols shown in the event data 4101 of FIG. 4. The information of the device corresponding to the device ID included in the received event data is described using the symbols shown in the device information 4201 of FIG. 8.

In step S901, the event processor 303 determines whether or not the event received from the device 102 corresponds to an alert whose reception has been stopped. Specifically, the event processor 303 determines whether or not the alert information 801 of the device information 4201 acquired in step S610 includes the alert type 802 and the alert target 803 same as the alert type 4107 and the alert target 4108 of the received event data 4101.

If the alert information 801 includes the type and the target same as the alert type 4107 and the alert target 4108, the event processor 303 determines that the received event corresponds to the alert whose reception has been stopped (Yes in step S901), and ends the processing of this flowchart.

On the other hand, if the alert information 801 does not include the type or the target same as the alert type 4107 or the alert target 4108, the event processor 303 determines that the received event does not correspond to an alert whose reception has been stopped (No in step S901), and the event processor 303 advances the processing to step S902.

In step S902, the event processor 303 acquires, from the event reception history manager 304, the past event history information including the parameters same as the device ID 4105, the alert type 4107, and the alert target 4108 of the received event data 4101 relating to real-time events.

In step S903 the event processor 303 determines, based on the event history acquired in step S902, whether or not the frequency of events of the alert received from the device within a predetermined period exceeds a threshold value. The predetermined period and the threshold are predetermined, and the predetermined parameter is not limited to a specific value (for example, a value corresponding to an abnormal frequency of notices is set based on properties of a device or an event, e.g., 1000 notices per hour). The acquired event history may include all events having the same device ID, alert type, and alert target, or may include only the limited events that were generated during a certain period of time. The event history may be obtained by counting events that satisfy a predetermined condition.

When determined that the frequency of events related to the alert of the device generated within the predetermined period does not exceed the threshold value (No in step S903), the event processor 303 advances the processing to step S616.

On the other hand, when determined that the frequency of events related to the alert of the device generated within the predetermined period exceeds the threshold value (Yes in step S903), the event processor 303 determines that events have been received with abnormal frequency, and advances the processing to step S904.

In step S904, the event processor 303 instructs the device manager 301 to stop the transmission of real-time events related to the alert generated in the device. For example, if the alert event is classified as "Part", a request such as the data sending request 4016 of FIG. 8 is sent to the device 102. In response to the request, the device manager 301 controls the device 102 to stop transmitting real-time event considered to be abnormal (the real-time event classified as "Part" in this example), and controls the devices 102 to transmit only other real-time events and regular events. In response to the request from the event processor 303, the device manager 301 transmits the data sending request to the device 102.

In step S905, after transmitting the data sending request to the devices 102, the device manager 301 adds the alert type 4107 of the received event data 4101 as alert information to the alert information 801 included in the device information 4201 of the device. In addition, the device manager 301 updates the stop flag 4206 to "true" for stopping the reception of events from the device 102 and advances the process to step S616.

The processing for regular events according to the third embodiment will be described with reference to FIG. 9B. FIG. 9B is a flowchart showing the processing for regular events according to the third embodiment. In FIG. 9B, the processes shown with the same symbols as those in FIG. 6C are same as those in FIG. 6C, and the descriptions thereof are omitted.

In the third embodiment, when determined that receiving events from the device 102 has been stopped (Yes in step S621), the processing of steps S910 to S913 is executed, and then it is checked based on the received event data whether or not the problem of the device relating the event stopped from receiving has been resolved. The received event data is described using the same symbols as the event data 4116 of FIG. 4. The information of the device corresponding to the device ID of the received event data is described using the same symbols as the device information 4201 of FIG. 8.

In step S910, the event processor 303 selects one alert to be processed from the alert information 801 of the device information 4201 acquired in step S620. In step S911, the event processor 303 checks whether the alert information 801 of the event data 4116 received from the device 102 includes the alert to be processed. More specifically, the event processor 303 compares the alert type 4107 and the alert target 4108 included in the event data 4101 with the alert type 802 and the alert target 803 of the alert to be processed.

If the alert information of the received event data does not include an alert to be processed, the event processor 303 determines that the problem related to the alert has been solved (Yes in step S911), and advances the processing to step S912. In step S912, the event processor 303 deletes the alert from the alert information 801, and advances the processing to step S913.

On the other hand, if the alert information of the received event data includes an alert to be processed, the event processor 303 determines that the problem relating to the alert has not been solved (No in step S911), and advances the processing to step S913.

In step S913, the event processor 303 refers to the alert information 801 included in the device information 4201, and checks whether or not all the alerts have been processed. If there is an alert that has not yet been processed (No in step S913), the event processor 303 returns the processing to step S910 and processes the alert that has not yet been processed. On the other hand, if all the alerts have been processed (Yes in step S913), the event processor 303 advances the processing to step S914.

In step S914, the event processor 303 determines whether or not there is an alert that has been deleted from the alert information indicating events to be stopped from sending because the problem has been determined to be solved in steps S910 to S913. If there is no deleted alert (No in step S914), the event processor 303 advances the processing to step S625. On the other hand, if there is a deleted alert (Yes in step S914), the event processor 303 advances the processing to step S915.

In step S915, the event processor 303 instructs the device manager 301 to start receiving real-time events in which the abnormality is considered to be solved. Specifically, when determined that the abnormality of the classification "Part" has been resolved while notices of events related to the "Part" had been stopped, the event processor 303 instructs the device manager 301 to transmit a data sending request to the device 102. The transmitted data sending request includes the "Part" as a classification of the real-time event to be transmitted. The transmitted data sending request also includes the "Part" as a classification of the regular event to be transmitted. The regular event is specified with intervals of every twelve hours as an event trigger condition. In other words, the event processor 303 transmits to the device 102 a request generated before detecting an abnormality relating to the "Part", such as the data sending request 4001 shown in FIG. 4.

In step S916, after transmitting the data sending request to the device 102, the device manager 301 determines whether or not the alert information 801 of the device information 4201 no longer includes an alert whose transmission has been stopped. If there is no alert whose transmission has been stopped (Yes in step S916), the device manager 301 advances the processing to step S624, and updates the stop flag 4206 included in the device information 4201 to "false" indicating that the transmission of events is not stopped. On the other hand, if there is one or more alerts whose transmission is stopped (No in step S916), the device manager 301 advances the processing to step S625, and updates the alert information.

According to the processing of the present embodiment, an abnormality is determined for each event, and transmission of only the event regarded to be abnormal notices is stopped. The present embodiment allows to stop the transmission of only events having a problem, and allows to continue processing for events having no problem.

Fourth Embodiment

In the first to third embodiments, when determined that a problem related to the alert has been resolved based on regular events, the transmission of the real-time events is immediately restarted. According to the above configuration, when the generation of the alert and the resolution of the problem are continuously notified, the following problems may be generated. For example, if a body cover of the device 102 is half open, a sensor may falsely detect that the cover is open and falsely detect that the cover is closed too. That is, depending on the accuracy of detection of the sensor included in the device 102, the generation of the alert and the resolution of the problem may be repeatedly notified. In this case, when the resolution of the problem is detected at the timing of verification made for reporting a regular event, it is reported through the regular event that the problem has been resolved. That is, the transmission of the real-time event that has been stopped would be restarted even though the problem related to the alert has not been solved.

In the fourth embodiment, the above-described case is considered. As in the first to third embodiments, when determined that a problem has been solved based on the regular event, the transmission of real-time events is temporarily restarted. The transmission of real-time events is verified for a predetermined period of time. When determined as a result of the verification that there is no problem in transmitting real-time events, the transmission is continued. When determined that the problem has not been solved, the transmission of real-time events is stopped again. In this embodiment, only the differences from the first to third embodiments are described. The configurations and processes that are not specifically shown are same as those of the first to third embodiments.

<Data Structure>

FIG. 10A shows a data structure of the device information held by the monitoring server 101 of the fourth embodiment. FIG. 10A shows an example of adding a status attribute for indicating that verification is in progress and a time of starting the verification to the alert information 801 of the device information 4201 shown in FIG. 8.

The alert information 801 shown in FIG. 10A defines two alerts. As in the third embodiment, the first alert includes a parameter "NeesReplacement" as an alert type 1001 and a parameter "FixingUnit" as an alert target 1002. The first alert includes a parameter "Stopped" as a status 1003 indicating whether transmission of the alert has been stopped or the alert is under verification. The first alert indicates that transmission of an alert event indicating the necessity of replacing a fixing device is stopped. The second alert includes a parameter "CoverOpen" as an alert type 1004, a parameter "Body" as an alert target 1005, and a parameter "Verifying" as a status 1006. The second alert also includes a time 1007 indicating when the problem was determined to be resolved and the verification of the resolution was started. The second alert indicates that the resolution of a problem of the body's cover being open is under verification.

FIG. 10B shows a data structure of a data sending request transmitted to the device 102 according to the fourth embodiment. According to the present embodiment, in addition to the classification "Part" shown in the first to third embodiments, the classification "Cover" is excluded from events to be transmitted in real-time.

A classification 1011 included in the data sending request 4016 specifies objects to be transmitted as real-time events when transmitting real-time events is stopped. In the first and second embodiments, all of the classifications "Alert", "Capacity", "Cover", and "Part" are excluded from events to be transmitted, as shown in the target 4017 of FIG. 4. In this example, the two classifications "Part" and "Cover" regarded to be abnormal notices are excluded from the events to be transmitted.

A classification 1012 included in the data sending request 4016 specifies objects to be transmitted as regular events when transmitting real-time events is stopped. The classification 1012 specifies the two classifications "Part" and "Cover", which are regarded to be abnormal notices, as events to be transmitted. Similar to the condition 703 of FIG. 7 shown in the second embodiment, the transmission request 810 of regular events specifies intervals of every hour as an event trigger condition.

A classification 1013 included in the transmission request 4003 of regular events specifies the two classifications "Alert" and "Capacity" that correspond to alerts other than the classifications "Part" and "Cover" regarded to be abnormal notices. The transmission request 4003 specifies intervals of twelve hours as an event trigger condition.

<Process of Detecting Resolution of Abnormality>

The processing of the monitoring server 101 according to the fourth embodiment will be described with reference to FIGS. 11A and 11B. The processing of the flowcharts shown in FIGS. 11A and 11B is realized by the central processing unit 201 of the monitoring server 101 (information processing apparatus) loading a program stored in the HDD 203 or the like into the memory 202 as necessary and executing the program.

Figure 11A:
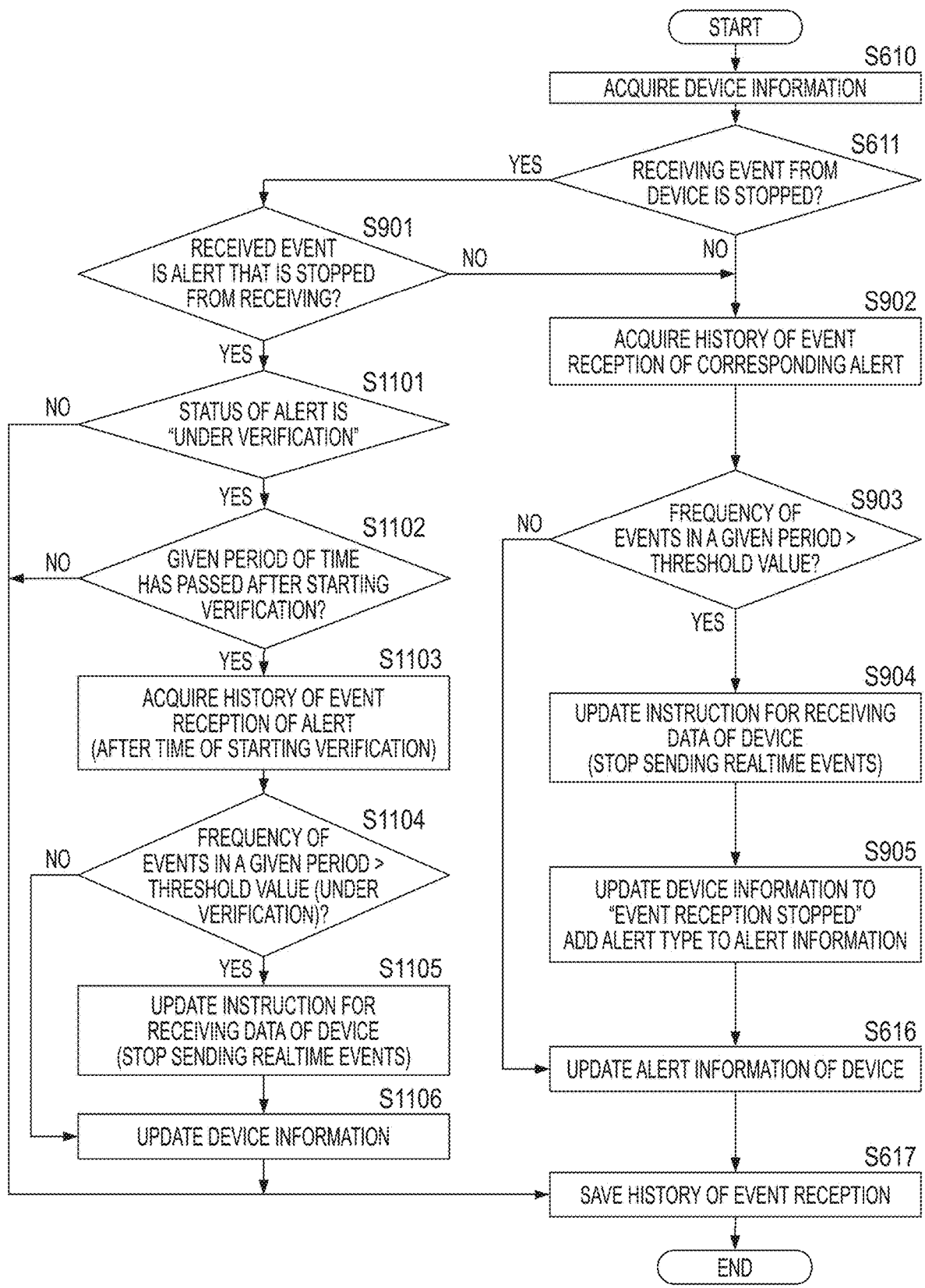
FIG. 11A is a flowchart showing processes for real-time events executed by the status monitoring server according to one or more aspects of the present disclosure.
Figure 11B:
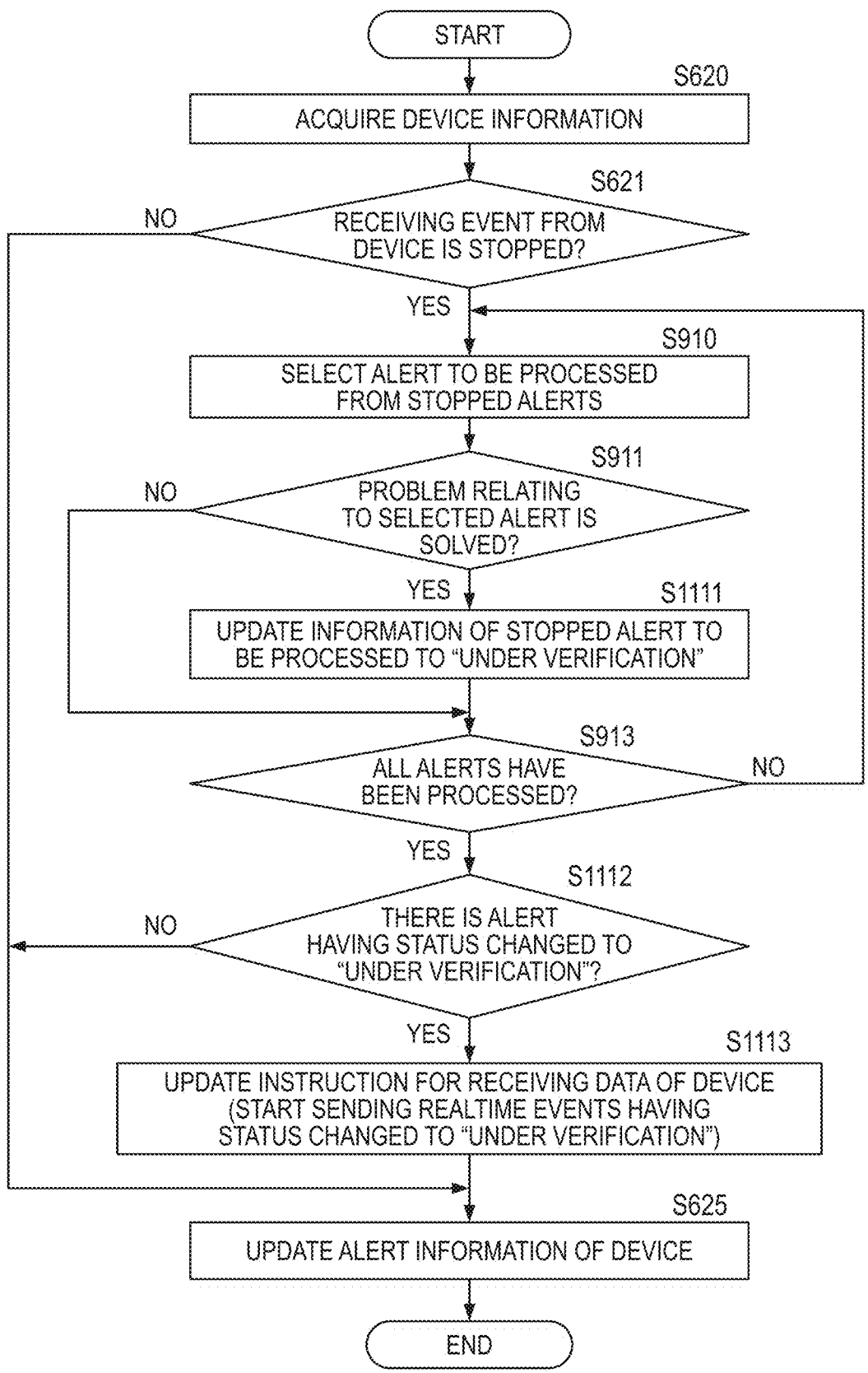
FIG. 11B is a flowchart showing processes for regular event performed by the status monitoring server according to one or more aspects of the present disclosure.

FIG. 11A is a flowchart showing the processing for real-time events according to the fourth embodiment. In this embodiment, when it is detected through regular events that the abnormality has been resolved, the transmission of real-time events is started with a status indicating that verification is in progress. If it is determined through the transmission of real-time events that there is no problem in the device, the transmission of real-time events is continued. If the device is determined to have a problem, the transmission of real-time events is stopped. In FIG. 11A, the processes shown with the same symbols as those in FIGS. 6, 9A, and 9B are same as those in FIGS. 6, 9A, and 9B, and the descriptions thereof are omitted.

In the fourth embodiment, when determined that a real-time event received from the device 102 corresponds to an alert for which reception of real-time events has been stopped (Yes in step S901), the event processor 303 advances the processing to step S1101. The received event data is described using the symbols of the event data 4101 shown in FIG. 4. The information of the device corresponding to the device ID of the received event data is described using the symbols of the device information 4201 shown in FIG. 10A.

In step S1101, the event processor 303 determines whether or not the status of the alert determined to be stopped from receiving in real-time in step S901 indicates that verification is in progress. Specifically, the event processor 303 refers to the status of the alert determined to be stopped from receiving. If the status indicates a parameter "Verifying", the event processor 303 determines that the alert is under verification. If the status indicates other statuses than "Verifying" (e.g., "Stopped"), the event processor 303 determines that the alert is not under verification. For example, when the alert determined to be stopped from receiving in step S901 is the first alert shown in FIG. 10A, the event processor 303 refers to the status 1003 included in the alert information 801 shown in FIG. 10A. Since the status indicates "Stopped", the event processor 303 determines that the alert is not under verification. When the alert determined to be stopped from receiving in step S901 is the second alert shown in FIG. 10A, the event processor 303 refers to the status 1006 of the alert information 801 shown in FIG. 10A. Since the status indicates "Verifying", the event processor 303 determines that the alert is under verification.

When determined that the alert is not under verification (No in step S1101), the event processor 303 advances the processing to step S617. On the other hand, when determined that the alert is under verification (Yes in step S1101), the event processor 303 advances the processing to step S1102.

In step S1102, the event processor 303 determines whether or not a predetermined period of time has elapsed since the verification started. More specifically, the event processor 303 refers to the time 1007 indicating when the verification started that is included in the alert information 801 of the device information 4201, and determines whether a difference between the current time and the time 1007 exceeds a predetermined amount of time.

If the above difference does not exceed the predetermined amount of time (No in step S1102), the event processor 303 determines that the elapsed time for verification is insufficient, and advances the processing to step S617. On the other hand, if the above difference exceeds the predetermined amount of time (Yes in step S1102), the event processor 303 advances the processing to step S1103.

In step S1103, the event processor 303 acquires past (but after the time 1007 indicating when the verification stated) event history information having the parameters same as the device ID 4105, the alert type 4107, and the alert target 4108 of the received event data 4101 from the event reception history manager 304.

In step S1104, the event processor 303 determines based on the event history information acquired in step S1103 whether the frequency of events transmitted from the device within a predetermined period of time exceeds a threshold value. The predetermined period of time and the threshold value are predetermined for verification, and these parameters are not limited to specific values (for example, the parameters may be set to values considered to be abnormal as a frequency of notices based on properties of the device or event, e.g., 100 events within 5 minutes). The process of acquiring the event history may be configured to acquire information of all events having the same device ID, alert type, and alert target, or may be configured to acquire information of the events generated within a predetermined period of time. The event processor 303 may be configured to count only events satisfying a predetermined condition to acquire the information of events.

When determined that the frequency of events received from the device within the predetermined period does not exceed the threshold value (No in step S1104), the event processor 303 advances the processing to step S1106 to update the device information. In step S1106, the device manager 301 deletes, from the alert information 801, the alert determined in step S901 to be stopped from receiving, and advances the processing to step S617.

On the other hand, when determined that the frequency of events received from the device within the predetermined period exceeds the threshold value (Yes in step S1104), the event processor 303 determines that events have been received with abnormal frequency, and advances the processing to step S1105.

In step S1105, the event processor 303 instructs the device manager 301 to stop receiving real-time events. For example, when determined that events relating to the classification "Cover" are associated with abnormal notices, the event processor 303 does not include the "Cover" in the classifications to be transmitted as real-time events. The event processor 303 transmits to the device 102 a request to include the "Cover" in the classifications to be transmitted as regular events, which have intervals of one hour as a specified event trigger condition. The request may be the data sending request 4016 shown in FIG. 10B, for example. The device manager 301 controls the devices 102 via the request to stop sending real-time events considered abnormal and to send only regular events. In response to the request from the event processor 303, the device manager 301 sends the data sending request to the device 102.

In a case where the process of step S1106 is executed after the data sending request is sent to the device 102 in step S1105, the device manager 301 updates the status of the alert determined to be stopped from receiving in step S901 to the "Stopped", and advances the processing to step S617. For example, if the alert determined to be stopped from receiving in step S901 is the second alert shown in FIG. 10A, the device manager 301 updates the status 1006 included in the alert information 801 of FIG. 10A to the "Stopped".

Next, the processing for regular events according to the fourth embodiment will be described with reference to FIG. 11B. FIG. 11B is a flowchart showing the processing for regular events according to the fourth embodiment. In FIG. 11B, the processes shown with the symbols same as those shown in FIGS. 6, 9A, and 9B are same as those shown in FIGS. 6, 9A, and 9B, and the descriptions thereof are omitted.

In the fourth embodiment, if it is determined in step S911 that a problem related to the alert to be processed, which had been stopped from receiving, has been solved (Yes in step S911), the event processor 303 advances the processing to step S1111. The received event data is described using the symbols of the event data 4116 shown in FIG. 4. The information of the device corresponding to the device ID of the received event data is described using the symbols of the device information 4201 shown in FIG. 10A.

In step S1111, the event processor 303 updates the status of the alert to be processed to "Verifying" indicating that the alert is under verification, and advances the processing to step S913. For example, when the alert information to be processed is the first alert shown in FIG. 10A, the event processor 303 updates the status 1003 included in the alert information 801 of FIG. 10A to "Verifying".

In step S1112, the event processor 303 checks whether there is an alert that has been determined in steps S910 to S913 that a problem has been resolved and whose status has been updated to "Verifying" indicating that verification is in progress. If there is no such an alert updated to the "Verifying" indicating that verification is in progress (No in step S1112), the event processor 303 advances the processing to step S625. On the other hand, if there is an alert updated to the "Verifying" indicating that verification is in progress (Yes in step S1112), the event processor 303 advances the processing to step S1113.

In step S1113, the event processor 303 instructs the device manager 301 to start receiving the real-time events for which it has been determined that the abnormality has been resolved. If it is determined, like the example described above, that a problem relating to the classification "Cover" has been solved while transmitting events relating to the classification "Cover" has been stopped, the event processor 303 transmits a request such as the data sending request 4016 of FIG. 8 to the device 102. In the above request, the classification for sending events in real-time includes the "Cover", and the classification for sending regular events, in which intervals of every twelve hours are set as an event trigger condition, includes the "Cover".

According to the present embodiment, when the transmission of real-time events is restarted, the status of notices transmitted in real-time is verified for a predetermined period of time. If there is no problem found, receiving real-time events are restarted. If it is determined that the problem related to the alert has not been solved or the abnormality is left in the device, a process not to restart receiving real-time events is executed.

Fifth Embodiment

While transmitting real-time events is stopped, only regular events are transmitted. Thus, a screen displayed on the UI provided for the device 102 may be different from a screen displayed on the UI provided for the monitoring server 101. As an example for dealing with the above problem, in the fifth embodiment, a message is displayed on the UI of the monitoring server 101, which allows a user to recognize that transmitting real-time events has been stopped while stopping the transmission of real-time events. In the present embodiment, only differences from the first to fourth embodiments are described. The configurations and processes not specifically shown are same as those of the first to fourth embodiments.

<User Interface>

FIG. 12 shows an example of a UI provided for the monitoring server 101 according to the fifth embodiment. Similar to the UI shown in FIG. 5, the UI shown in FIG. 12 displays a message indicating that transmitting real-time events has been stopped while stopping the transmission of real-time events. A message 1201 relating to an error according to the fifth embodiment indicates that the error has to be taken care of by a user when such an error occurs. Further, the message 1201 shows that transmitting real-time events has been stopped and that the comment displayed on the UI of the monitoring server 101 may be different from the comment displayed on the UI of the device 102. The message 1201 relating to errors displayed on the UI is displayed when the device information 4201 shown in FIG. 10A is acquired via an API (not shown) provided by the monitoring server 101, and if the stop flag 4206 included in the device information 4201 indicates "true".

The fifth embodiment allows a user to easily recognize that a status or a message displayed on the UI provided for the devices 102 may be different from a status or a message displayed on the UI provided for the monitoring server 101 because of the real-time events being stopped from transmitting.

In a system in which many clients are connected, such as an IoT system, it is common practice to increase or decrease resources of a server depending on the connected clients or the load of the amount of data to be transmitted. In such a system, if abnormal data is generated from a client and the data is transmitted, the resources of the server are consumed in proportion to the amount of the data received. The consumption of resources creates unnecessary costs. A system may be considered in which the number of processes executed simultaneously is determined in advance based on the assumed number of clients and the amount of data received, the received data is buffered, and the buffered data is sequentially processed in a range not exceeding the allowable number of processes executed simultaneously. In such a system, a large amount of abnormal data received from a client is buffered, which causes a delay in the processing performed for other clients. The conventional techniques do not control the timings of notifications of events transmitted in a real-time and on a regular basis. The conventional techniques stop transmission of events from a client when data is determined to be abnormal until the client determines that the state of the abnormality has been cleared. As a result, it is not possible for the conventional techniques to perform processing on any event while transmitting events from the client is stopped. Further, since the control is performed between the server and the client in the conventional techniques, it is not possible to realize the control depending on purposes of application services that handle data of the client.

According to each embodiment of the present disclosure, the monitoring server 101 detects an amount of transmitted data that exceeds the assumable or acceptable amount (transmission of abnormal data) from a client terminal such as the device 102, determines whether or not the problem of the above transmission has been resolved, and controls transmission operations executed by the client while considering the timing of transmitting real-time events and regular events. According to the present disclosure, when determined that the client terminal is sending abnormal data, delay of processing executed by a server due to the transmission of abnormal data can be flexibly prevented while keeping on monitoring the client through periodic notices from the client terminal. In addition, unnecessary and additional costs for the server can be avoided. Thus, the present disclosure allows to suppress unnecessary costs for a server and reduce an impact on processing executed by a server even when abnormal data is generated in the device and notices are received with abnormal frequency from the device. Furthermore, the present disclosure also allows to keep on monitoring the device via regular events even when transmission of real-time events from the device is stopped.

The present disclosure is not limited to the above embodiments, and various modifications are possible. For example, an example in which some of the configurations of any of the embodiments are added to other embodiments or an example in which some of the configurations of any of the embodiments are replaced with some of the configurations of other embodiments is also an embodiment of the present disclosure. The scope of the following claims is to be accorded the broadest interpretation so as to encompass all such modifications and equivalent structures and functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-189695, filed Nov. 28, 2022, which is hereby incorporated by reference herein in its entirety.

What is claimed is:

1. A system including one or more client terminals and a service that receives notices from the client terminal,
   the client terminal comprising a transmitting unit operable to execute:
      first transmission process to transmit a first notice to the service in real time, the first notice being information of an event generated in the client terminal; and
      second transmission process to transmit a second notice to the service, the second notice being information of an event to be transmitted in response to a result of a regularly check, in the client terminal, whether the event has been generated or not, and
   the service comprising a controller configured to execute:
      a first control to transmit a first data sending request to the client terminal when a frequency of the first notice received from the client terminal exceeds a first threshold within a first period of time, the first data sending request causing the transmitting unit of the client terminal to stop the first transmission process and to execute the second transmission process, and
      a second control to transmit a second data sending request to the client terminal when determined that a problem in the client terminal has been solved based on the second notice received from the client terminal instructed to stop the first transmission process by the first data sending request, the second request causing the transmitting unit of the client terminal to restart first transmission process.

2. The system according to claim 1,
   wherein the transmitting unit, based on the second transmission process, transmits the second notice at specified intervals to the service, and
   wherein the controller specifies, in the first data sending request, a second interval shorter than a first interval as the specified interval for transmitting the second notice, the first interval being the specified interval used for transmitting the second notice before transmitting of the first notice is stopped by the first data sending request.

3. The system according to claim 1,
   wherein the controller transmits the first data sending request to the client terminal when a frequency of the first notice about a same event received from the client terminal exceeds the first threshold within the first period of time, the first request causing the transmitting unit of the client terminal to stop transmitting the first notice about the same event, and
   wherein the controller further transmits the second data sending request to the client terminal when determined that a problem about an event in the client terminal has been solved based on the second notice, the second data sending request causing the transmitting unit of the client terminal to restart transmitting the first notice about the event corresponding to the solved problem.

4. The system according to claim 1,
   wherein the second control includes excluding the client terminal that restarts transmitting the first notice from subjects of the first control, and
   wherein the controller transmits the first data sending request to the client terminal excluded from the subjects of the first control when a frequency of the first notice received from the excluded client terminal exceeds a second threshold during a period between second and third periods of time after the restart of transmitting the first notice.

5. The system according to claim 1,
   wherein the service comprises a providing unit that provides information of the client terminal, and
   wherein the providing unit provides information of a client terminal indicating that the client terminal currently stops transmitting the first notice.

6. A method of controlling a system including one or more client terminals and a service that receives notices from the client terminal, the method comprising:
   executing, in the client terminal, first transmission process to transmit a first notice to the service in real time, the first notice being information of an event generated in the client terminal;
   executing, in the client terminal, second transmission process to transmit a second notice to the service, the second notice being information of an event to be transmitted in response to a result of a regularly check, in the client terminal, whether the event has been generated or not;
   executing, in the service, a first control to transmit a first data sending request to the client terminal when a frequency of the first notice received from the client terminal exceeds a first threshold within a first period of time, the first data sending request causing the client terminal to stop the first transmission process and to execute the second transmission process; and
   executing, in the service, a second control to transmit a second data sending request to the client terminal when determined that a problem in the client terminal has been solved based on the second notice received from the client terminal instructed to stop the first transmission process by the first data sending request, the second request causing the client terminal to restart first transmission process.

7. The method according to claim 6,
wherein the client terminal, based on the second transmission process, transmits the second notice at specified intervals to the service, and
wherein the service specifies, in the first data sending request, a second interval shorter than a first interval as the specified interval for transmitting the second notice, the first interval being the specified interval used for transmitting the second notice before transmitting of the first notice is stopped by the first data sending request.

8. The method according to claim 6,
wherein the service transmits the first data sending request to the client terminal when a frequency of the first notice about a same event received from the client terminal exceeds the first threshold within the first period of time, the first request causing the client terminal to stop transmitting the first notice about the same event, and
wherein the service further transmits the second data sending request to the client terminal when determined that a problem about an event in the client terminal has been solved based on the second notice, the second data sending request causing the client terminal to restart transmitting the first notice about the event corresponding to the solved problem.

9. The method according to claim 6,
wherein the second control includes excluding the client terminal that restarts transmitting the first notice from subjects of the first control, and
wherein the service transmits the first data sending request to the client terminal excluded from the subjects of the first control when a frequency of the first notice received from the excluded client terminal exceeds a second threshold during a period between second and third periods of time after the restart of transmitting the first notice.

10. The method according to claim 6, further comprising:
providing, in the service, information of a client terminal indicating that the client terminal currently stops transmitting the first notice.

* * * * *